US005995899A

United States Patent [19]

Miwa

[11] Patent Number: 5,995,899

[45] Date of Patent: Nov. 30, 1999

[54] DIESEL ENGINE FUEL INJECTION DEVICE

[75] Inventor: Hiromichi Miwa, Yokohama, Japan

[73] Assignee: Nissan Motor Co., Ltd., Yokohama, Japan

[21] Appl. No.: 09/047,341

[22] Filed: Mar. 25, 1998

[30] Foreign Application Priority Data

Mar. 25, 1997 [JP] Japan .................................... 9-071658

[51] Int. Cl.[6] ............................ G06F 19/00; F02D 41/08; B60K 41/12

[52] U.S. Cl. .................... 701/104; 701/110; 123/339.17; 477/111

[58] Field of Search ......................... 123/339.16, 339.17, 123/339.18, 339.19; 701/103, 104, 110; 477/111, 112, 113

[56] References Cited

U.S. PATENT DOCUMENTS

| | | | |
|---|---|---|---|
| 4,344,399 | 8/1982 | Matsumura et al. | 123/339.17 |
| 4,580,535 | 4/1986 | Danno et al. | 123/339.17 |
| 4,721,083 | 1/1988 | Hosaka | 123/339.17 |
| 4,742,462 | 5/1988 | Fujimori et al. | 123/339.19 |
| 4,780,827 | 10/1988 | Fujimori et al. | 701/104 |
| 4,899,280 | 2/1990 | Onari et al. | 701/103 |
| 4,957,083 | 9/1990 | Nakaniwa et al. | 701/104 |
| 5,365,903 | 11/1994 | Watanabe | 477/111 |
| 5,617,831 | 4/1997 | Shirakawa | 123/502 |

FOREIGN PATENT DOCUMENTS 63-230944 9/1988 Japan .

*Primary Examiner*—Willis R. Wolfe
*Attorney, Agent, or Firm*—Foley & Lardner

[57] ABSTRACT

An error learning value Dqsol* in an idle running state is calculated based on a difference Dqsol0 between a command signal Qsol2A when the engine is in the idle running state and an estimated fuel injection amount Qsolib necessary to maintain the idle running state. An injection amount error Dqsol1 is calculated from the error learning value Dqsol* and an estimated real injection amount Qsol_real is calculated from the current command signal Qsol2 and the injection amount error Dqsol1. By varying the estimated fuel injection amount Qsolib according to a loading condition of said engine, a fuel injection amount can be estimated precisely in various running states.

12 Claims, 25 Drawing Sheets

5 POSITION SENSOR
12 NOZZLE LIFT SENSOR
13 COOLING WATER TEMPERATURE SENSOR
14 ROTATION SPEED SENSOR
16 ACCELERATOR OPENING SENSOR
19 STARTER SWITCH
30 IGNITION SWITCH
31 POWER STEERING SWITCH
32 ELECTRICAL LOAD SENSOR
33 NEUTRAL SWITCH
34 AIR CONDITIONER SWITCH
35 FUEL TEMPERATURE SENSOR
36 VEHICLE SPEED SENSOR
37 BATTERY VOLTAGE SENSOR
38 CRANK ANGLE SENSOR
39 AIR FLOW METER

5 POSITION SENSOR
12 NOZZLE LIFT SENSOR
13 COOLING WATER
TEMPERATURE SENSOR
14 ROTATION SPEED SENSOR
16 ACCELERATOR OPENING SENSOR
19 STARTER SWITCH
30 IGNITION SWITCH
31 POWER STEERING SWITCH
32 ELECTRICAL LOAD SENSOR
33 NEUTRAL SWITCH
34 AIR CONDITIONER SWITCH
35 FUEL TEMPERATURE SENSOR
36 VEHICLE SPEED SENSOR
37 BATTERY VOLTAGE SENSOR
38 CRANK ANGLE SENSOR
39 AIR FLOW METER

DIESEL ENGINE FUEL INJECTION DEVICE

The contents of Tokugan Hei 9-71658, with a filing date of Mar. 25, 1997 in Japan, are hereby incorporated by reference.

FIELD OF THE INVENTION

This invention relates to a device for estimating an amount of fuel injected in a diesel engine for the purpose of performing engine control other than that of fuel injection amount.

BACKGROUND OF THE INVENTION

In a diesel engine comprising an exhaust gas recirculation system (EGR system), an exhaust gas recirculation amount (EGR amount) is controlled based for example on an amount of fuel injected in the engine.

Tokkai Sho 63-230994 published by the Japanese Patent Office in 1988 discloses a fuel injection control device having a function to estimate a real amount of fuel injected in the engine.

A target fuel injection amount which this device applies for the control of fuel injection amount is generally determined based on the load and rotation speed of the engine. To perform control of the fuel injection amount, the opening period of a fuel injection nozzle is increased or decreased so that a real injection amount coincides with the target injection amount. However, the target injection amount and real injection amount may not coincide due to variation of the performance of a fuel injection pump. Hence when the EGR is controlled based on the target injection amount, there is a possibility that the EGR amount will be out of a preferred range due to the difference between the target injection amount and real injection amount, and cause increased generation of smoke.

In this context in the aforesaid control device, the EGR amount is controlled taking account of the difference between a preset target fuel injection amount corresponding to a predetermined target idle rotation speed and a real fuel injection amount in a state when this target idle rotation speed is actually obtained, i.e. a fuel injection amount error.

In this way, the effect of dispersion in the fuel injection pump performance on EGR amount control is eliminated.

Such control is not limited to the control of EGR amount, and may be applied also to control of a swirl control-valve or to the control of a fuel injection period.

However when a load due to air conditioner or power steering for example is exerted on the engine, the fuel amount required to maintain the same rotation speed also varies, and as these load variations are not reflected in the calculation of fuel injection amount error, the EGR amount control precision also falls when the load deviates from standard conditions.

Moreover an error of injection amount in the idle running state is also largely subject to a difference in the initial lift amount of the fuel injection nozzle due to manufacturing errors or time-dependent changes, or to a difference of the nozzle opening pressure. If this initial lift amount or nozzle opening pressure is not considered in calculating injection amount error under the aforesaid load, a suitable correction amount is not obtained under all running conditions.

SUMMARY OF THE INVENTION

It is therefore an object of this invention to perform a precise calculation of an estimated real fuel injection amount upon which various engine controls are based.

In order to achieve the above object, this invention provides a fuel injection device for performing fuel injection in a diesel engine from a fuel injection nozzle based on a command signal Qsol2.

The device comprises a sensor for detecting an engine running state, and a microprocessor programmed to calculate the command signal Qsol2 based on the engine running state, calculate a predetermined fuel injection amount Qsolib necessary to maintain an idle running state according to a loading condition of the engine, calculate an error learning value Dqsol* in an engine idle running state based on a difference Dqsol0 between the command signal Qsol2A when the engine is in the idle running state and the predetermined fuel injection amount Qsolib, calculate an injection amount error Dqsol1 from the error learning value Dqsol*, and calculate an estimated real injection amount Qsol_real from the command signal Qsol2 and the injection amount Dqsol1.

When the engine is used to drive a vehicle equipped with an air conditioner, it is preferable that the loading condition comprises the condition of whether or not the air conditioner is operating.

When the engine is used to drive a vehicle equipped with a transmission, it is preferable that the loading condition comprises the condition of whether or not the transmission is in a neutral position.

It is also preferable that the device further comprises a sensor for detecting an operating state of the fuel injection nozzle, and the microprocessor is further programmed to calculate a nozzle error correction coefficient K_Glqfh from the operating state of the fuel injection nozzle when the engine is in the idle running state, and calculate an injection amount error Dqsol1 from the error learning value Dqsol* and the nozzle error correction coefficient K_Glqfh.

It is further preferable that the nozzle operating state detecting sensor comprises a sensor for detecting a lift amount of the fuel injection nozzle, and the microprocessor is further programmed to calculate the nozzle error correction coefficient K_Glqfh based on the nozzle lift amount when the engine is in the idle running state.

It is also preferable that the nozzle operating state detecting sensor comprises a sensor for detecting a lift start timing of the fuel injection nozzle, and the microprocessor is further programmed to calculate a nozzle error correction coefficient K_Glqfh based on the nozzle lift start timing when the engine is in the idle running state.

It is further preferable that the engine comprises a fuel injection pump for supplying pressurized fuel to the fuel injection nozzle, and the microprocessor is further programmed to fix a fuel supply timing of the fuel injection pump and calculate the nozzle error correction coefficient K_Glqfh based on a difference between the nozzle lift start timing when the fuel supply timing is fixed and a predetermined timing.

It is also preferable that the microprocessor is further programmed to set a gain B_Glqfh expressing an error magnification between the idle running state and a present state based on the engine running state, the gain B_Glqfh being smaller the nearer the present state is to the idle running state, calculate the injection amount error Dqsol1 by the following equation [1], and calculate the estimated real injection amount Qsol_real by the following equation [2]:

$$Dqsol1 = Dqsol^* \cdot B\_Glqfh \cdot K\_Glqfh \quad [1]$$

$$Qsol\_real = Qsol2 - Dqsol1 \quad [2]$$

It is also preferable that the microprocessor is further programmed to store the error learning value Dqsol* and determine whether or not an error learning condition holds for learning an error in a fuel injection amount based on the engine running state, and calculate the injection amount error Dqsol1 based on a stored error learning value Dqsol* when the condition does not hold.

It is further preferable that the error learning condition comprises the conditions that an engine rotation speed lies within an idle rotation speed region, and that a state where the engine is not under a load of a certain auxiliary device continues for a predetermined time.

When the engine is used to drive a vehicle, it is also preferable that the microprocessor is further programmed to calculate the error learning value Dqsol* by the following equation [3]:

$$Dqsol^* = Dqsol^*_{-1}(1-Klc) + Dqsol0 \cdot Klc \quad [3]$$

where,

- $Dqsol^*_{31\ 1}$=immediately preceding value of Dqsol*,
- Klc=time constant representing at least any one of cumulative engine rotation, distance travelled by vehicle and cumulative engine operating time,
- Dqsol0=difference between command signal Qsol2A when engine is in idle running state, and predetermined value Qsolib.

The details as well as other features and advantages of this invention are set forth in the remainder of the specification and are shown in the accompanying drawings.

DESCRIPTION OF THE PREFERRED EMBODIMENTS

Figure 1:
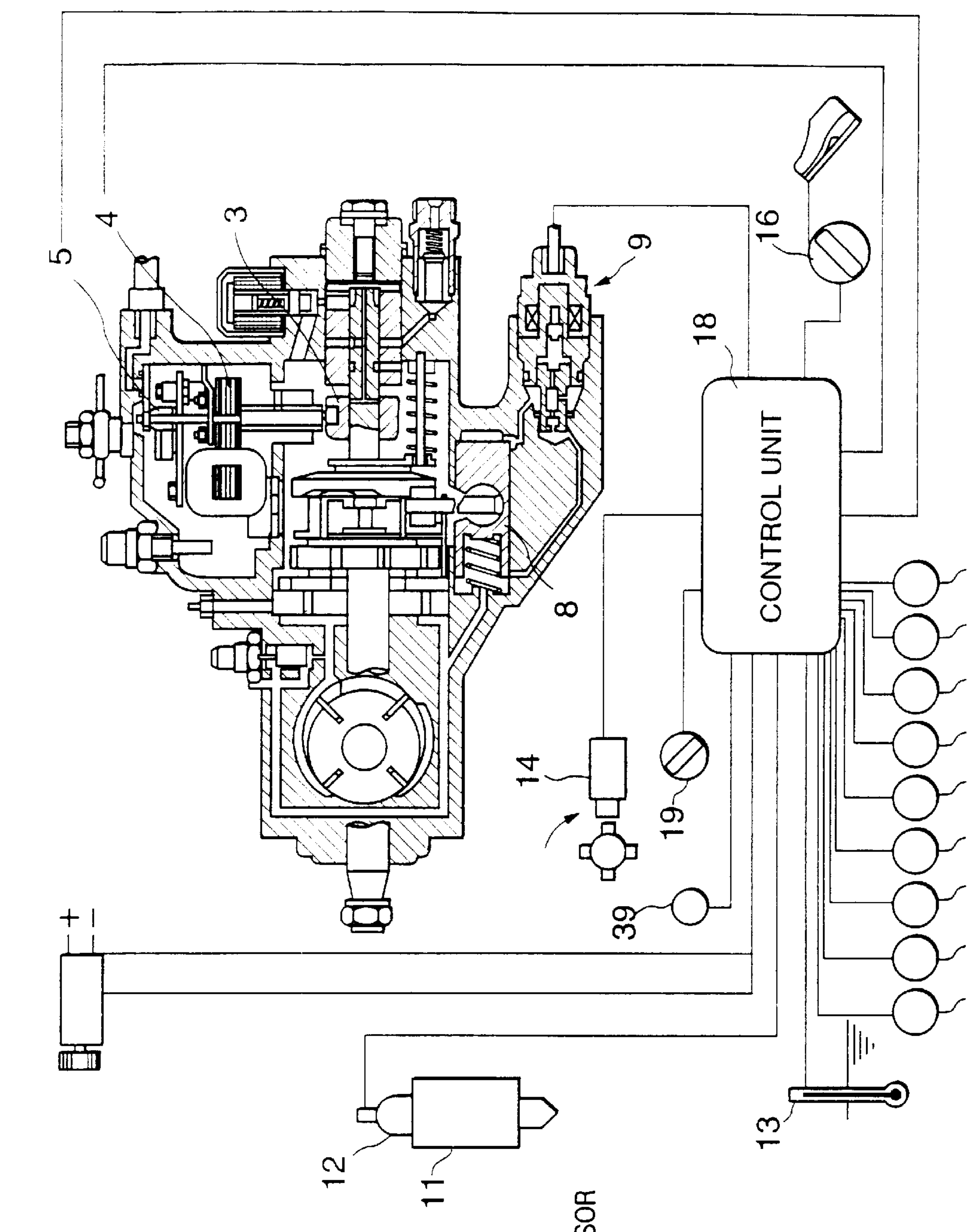
FIG. 1 is a schematic diagram of a fuel injection device according to this invention.

Referring to FIG. 1 of the drawings, a fuel injection pump 1 driven in synchronism with a vehicle diesel engine rotation is of a distributor type as is known for example from U.S. Pat. No. 5,617,831. Fuel pressurized by this fuel injection pump 1 is supplied to a fuel injection nozzle 11 through a fuel passage, not shown.

The fuel injection pump 1 varies a fuel injection amount according to a position of a control sleeve 3, and a fuel injection timing is varied according to a position of a timer piston 8.

The position of the control sleeve 3 is controlled via a rotary solenoid 4 in response to a signal from a control unit 18. The timer piston 8 varies the position according to an oil pressure acting on the timer piston 8. This oil pressure is controlled via a solenoid type control valve 9 in response to a signal from the control unit 18.

The control unit 18 comprises a microprocessor comprising a central processing unit (CPU), a read-only memory (ROM), a random-access memory (RAM) and an input-output interface (I/O interface).

A signal indicating a real fuel injection amount is input into the control unit 18 from a position sensor 5 which detects the position of the control sleeve 3.

Other signals are also input into the control unit 18 from various sensors, such as a nozzle lift sensor 12 for detecting a nozzle opening timing and a lift amount of the fuel injection nozzle 11, a cooling water temperature sensor 13 for detecting an engine cooling water temperature, an accelerator opening sensor 16 for detecting an accelerator opening, a rotation speed sensor 14 for detecting a pump rotation speed, a starter switch 19 for starting a motor which starts the engine, an ignition switch 30 for firing the engine, a power steering switch 31 showing that power steering is operating, an electrical load sensor 32 for detecting a battery load, a neutral switch 33 for detecting a neutral position of a transmission, an air conditioner switch 34 for detecting that an air conditioner is operating, a fuel temperature sensor 35 for detecting a fuel temperature, a vehicle speed sensor 36 for detecting a traveling speed of the vehicle, a battery voltage sensor 37, a crank angle sensor 38 for detecting a reference crank angle position and rotation speed of the engine, and an air flow meter 39 for detecting an engine intake air volume.

Based on these signals, the control unit 18 calculates the fuel injection amount and fuel injection timing of the fuel injection nozzle 11, and signals corresponding to the calculation results are output to the rotary solenoid 4 and control valve 9.

When the engine is running idle or ticking over, the control unit 18 also corrects the target injection amount such that the engine rotation speed coincides with a target idle rotation speed.

This correction process of the target injection amount performed by the control unit 18 will now be described with reference to flowcharts.

Figure 2:
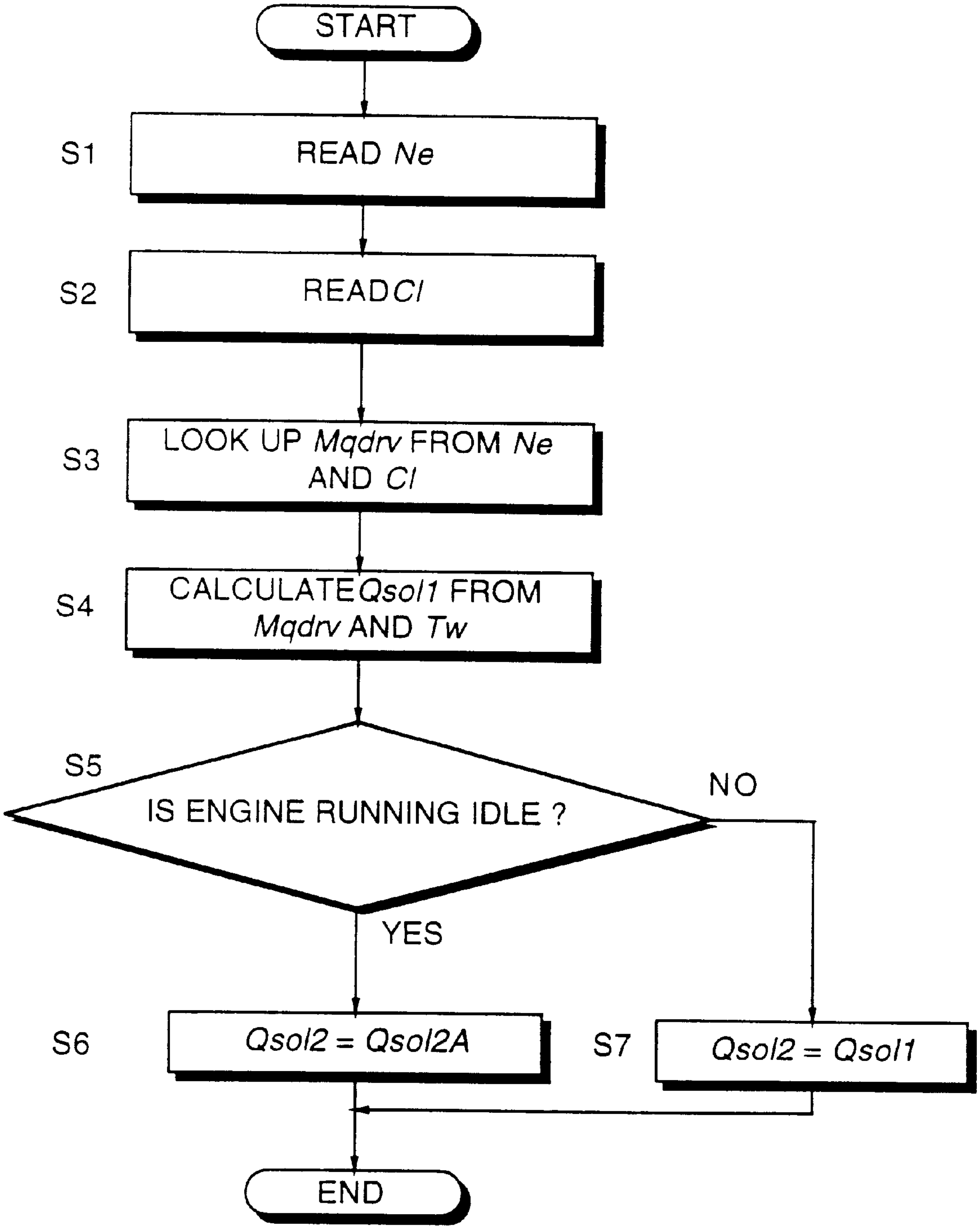
FIG. 2 is a flowchart describing a process for calculating a fuel injection amount correction value Qsol2 performed by a control unit according to this invention.

First, FIG. 2 shows a process for calculating a basic fuel injection amount, and it is performed at an interval corresponding to an engine fuel injection timing.

The engine rotation speed Ne is read in a step S1, and the accelerator opening Cl is read in a step S2.

Figure 3:
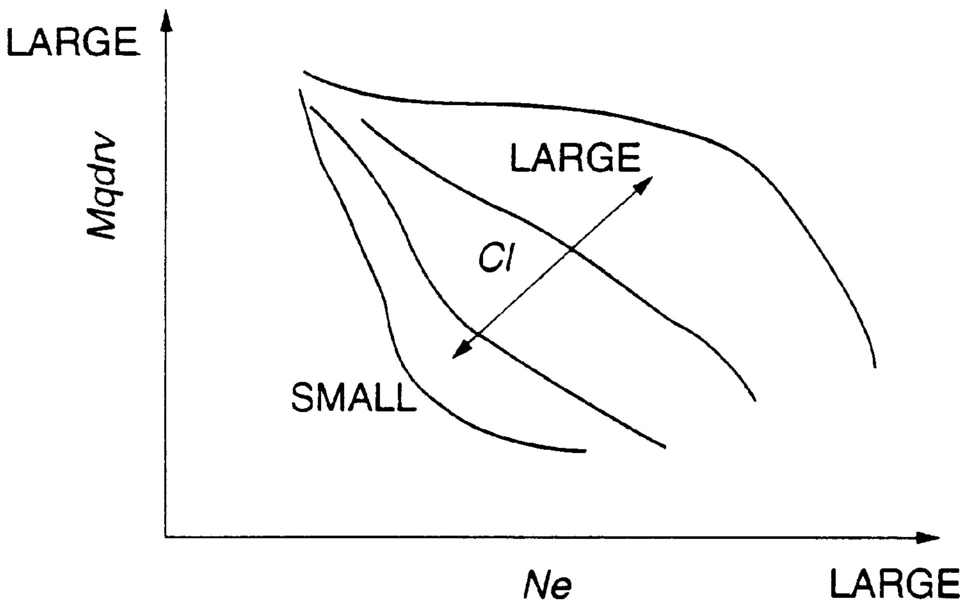
FIG. 3 is a diagram showing the contents of a map of a basic injection fuel amount Mqdrv stored by the control unit.

In a step S3, a basic fuel injection fuel amount Mqdrv is looked up in a map shown in FIG. 3 based on the rotation speed Ne and accelerator opening Cl, and in a step S4, a fuel injection amount Qsol1 is calculated by increasing this basic fuel injection amount Mqdrv based on the engine cooling water temperature Tw, etc.

In a step S5, it is determined whether or not the engine is in the idle running state. This determination is performed by determining for example whether or not the accelerator opening is 0.

When the engine is in the idle running state, the fuel injection amount Qsol1 is corrected in a step S6 such that the engine rotation speed Ne coincides with a target rotation speed Nset during idle running.

The fuel injection amount after this correction is defined as Qsol2A. A corrected fuel injection amount Qsol2 is then set equal to Qsol2A.

When the engine is not in the idle running state, the fuel injection amount Qsol1 is applied as the corrected fuel injection amount Qsol2 without performing correction, and the process is terminated. In the next fuel injection, a command signal corresponding to the corrected fuel injection amount Qsol2 set as described herein is output to the rotary solenoid 4.

Figure 4:
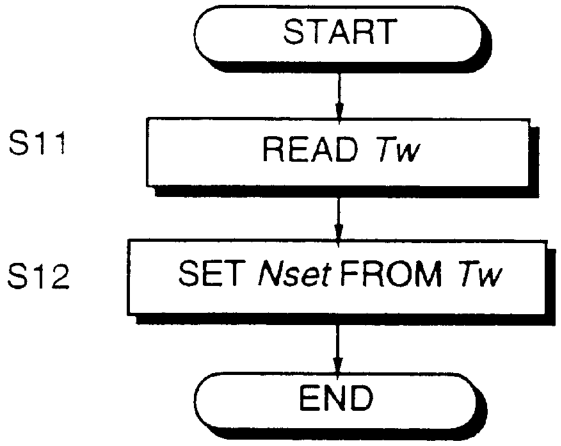
FIG. 4 is a flowchart describing a process for setting a target idle rotation speed Nset performed by the control unit.

FIG. 4 shows the process of setting the target idle rotation speed Nset used in the step S6. This process is also executed at an interval corresponding to the fuel injection timing.

Figure 5:
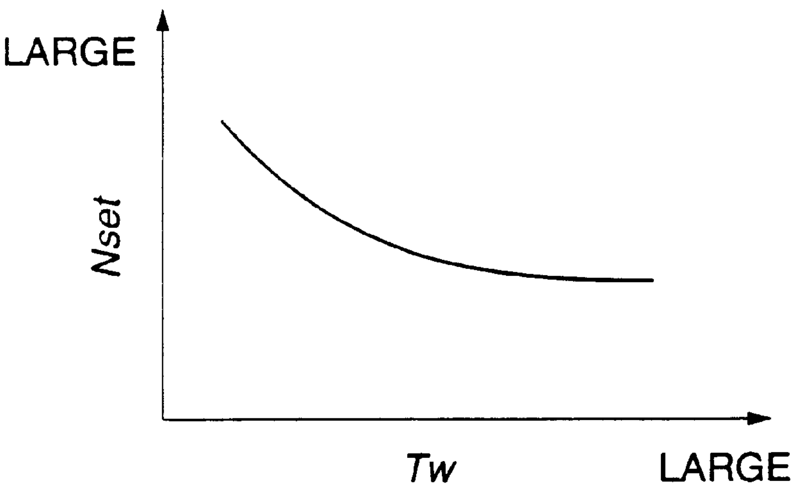
FIG. 5 is a diagram showing the contents of a map of the target idle rotation speed Nset stored by the control unit.

In a step S11, an engine cooling water temperature Tw is read. In a step 312, the target idle rotation speed Nset is set based on the cooling water temperature Tw referring to a map shown in FIG. 5, and the process is terminated. As shown in this map, the target rotation speed Nset is higher the lower the cooling water temperature Tw.

The corrected fuel injection amount Qsol2 generated by the process of FIG. 2 is a control target value which has been corrected to compensate for the standing error in the fuel injection nozzle 11, and control of fuel injection amount is performed using this value Qsol2 as the target injection amount. However, when control of the EGR amount or swirl valve using this value as a control parameter, the following problems arise.

For example, if the initial lift amount of the fuel injection nozzle 11 is less than a design value, the injection amount actually injected by the fuel injection nozzle 11 will be less than the injection amount corresponding to the fuel injection signal output to the rotary solenoid 4.

To compensate for this, the fuel injection amount is increased in the process of FIG. 2. At the same time, the EGR amount and swirl valve are controlled assuming that the target injection amount and injection amount correspond, i.e. assuming that there is no standing error in the fuel injection nozzle 11 and that the target injection amount and real injection amount correspond. Hence when these controls are performed based on the corrected fuel injection amount Qsol2, the injection amount is overestimated.

Therefore according to this invention, an estimated real injection amount Qsol_real used for control of the EGR amount and swirl valve, is found by further correcting the corrected fuel injection amount Qsol2 based on learning of the standing error in the fuel injection nozzle 11.

Figure 6:
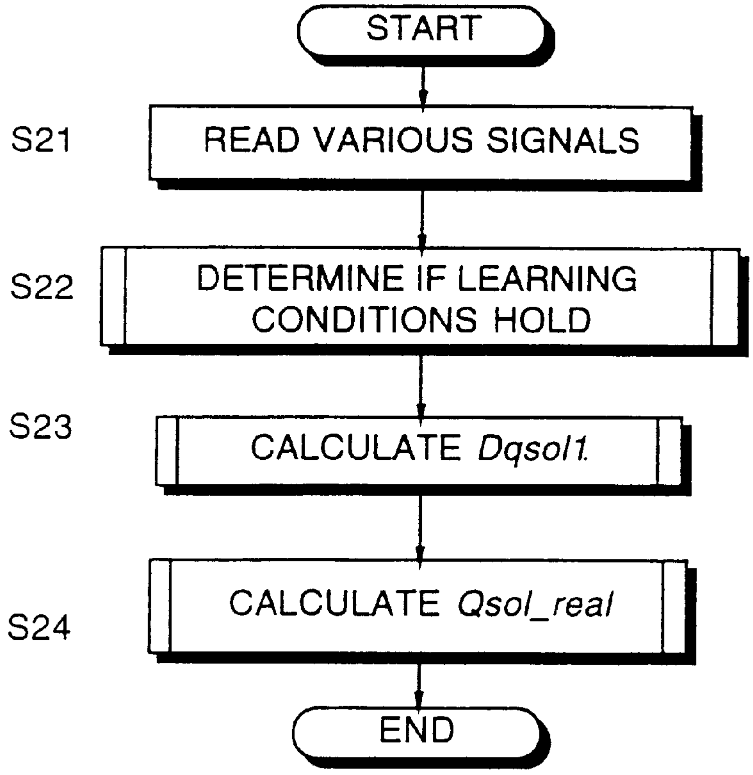
FIG. 6 is a flowchart describing a main routine for calculating an estimated real injection amount Qsol_real performed by the control unit.

This calculation process performed by the control unit 18 will now be described referring to FIG. 6.

This process is executed at an interval corresponding to the fuel injection timing.

In a step S21, signals from various sensors and switches are read, and in a step S22, it is determined whether or not to learn an error in the fuel injection amount.

In a step S23, the error in the fuel injection amount Dqsol1 is calculated.

In a step S24, the estimated real injection amount Qsol_real is calculated by applying the correction to the corrected fuel injection amount Qsol2 based on the error Dqsol1 calculated in the step S23, and the process is terminated.

The processing of the steps S22–S24 is performed by subroutines.

Next, these subroutines will be described referring to FIG. 24A to FIG. 36.

Figure 24A:
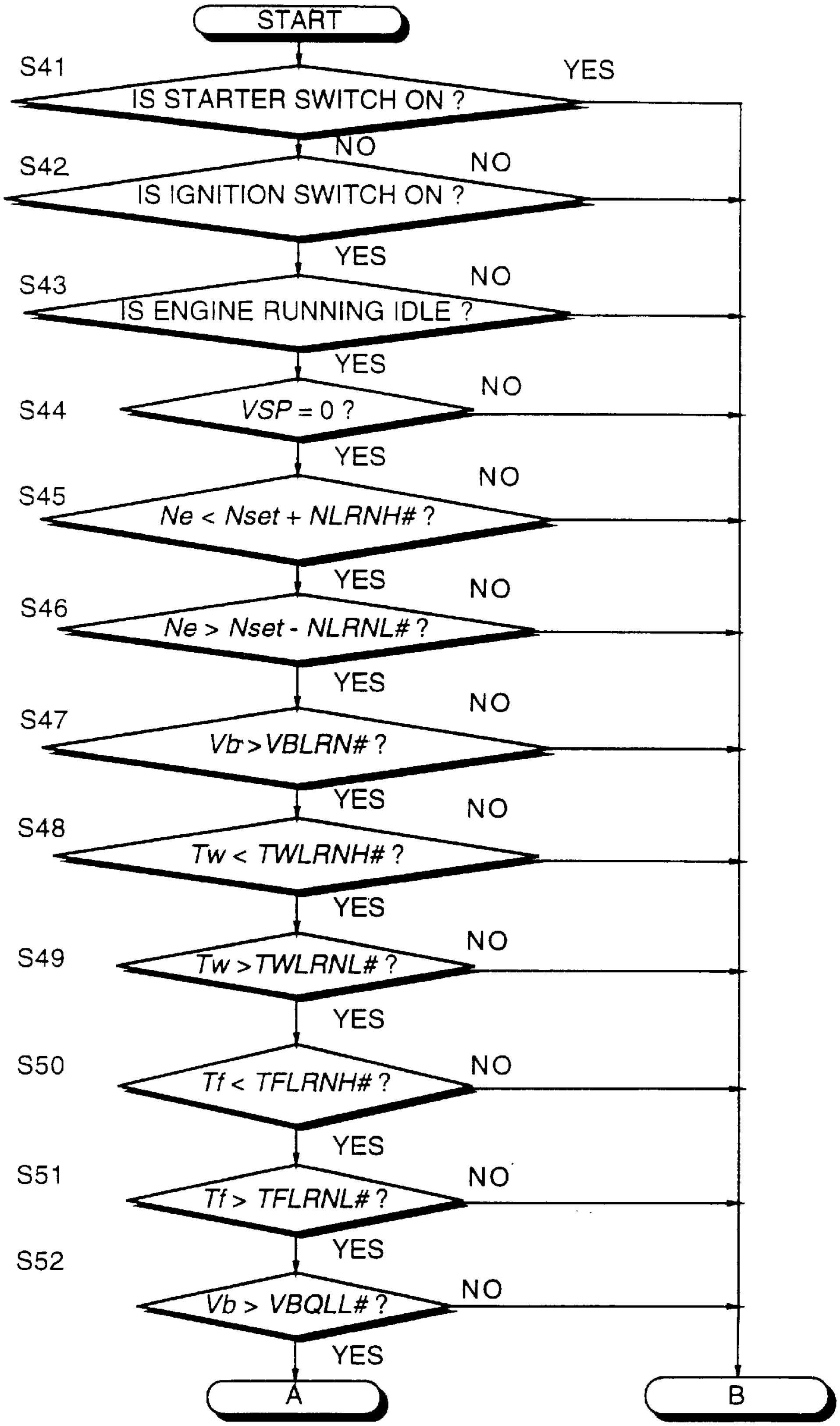
FIGS. 24A and 24B are flowcharts describing a process for determining a permission to learn a fuel injection amount error performed by the control unit.
Figure 24B:
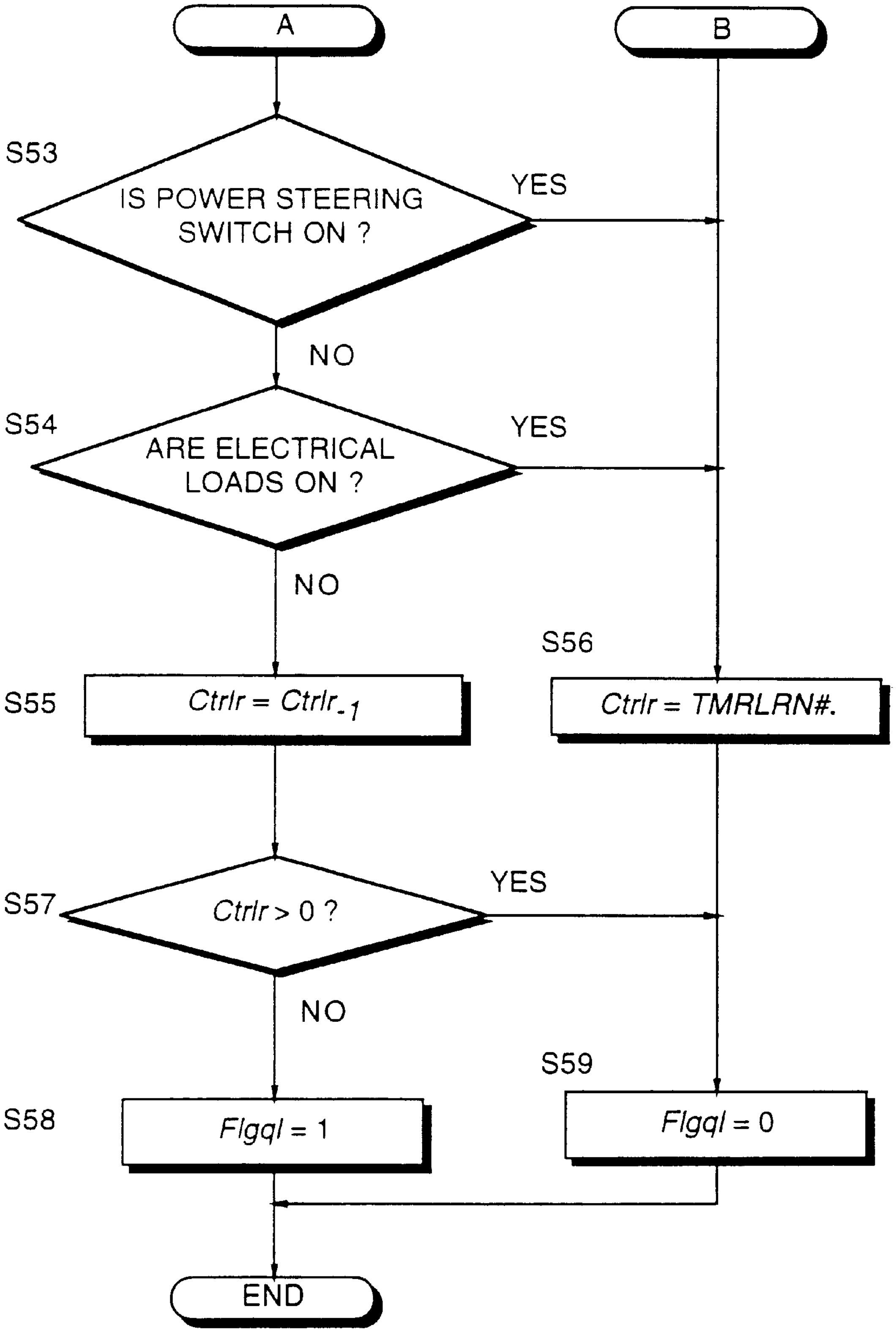

FIGS. 24A and 24B show a subroutine for determining whether or not to permit learning of the error in the fuel injection amount. This is equivalent to the processing of the above-mentioned step S22. This subroutine is also executed at an interval corresponding to the fuel injection timing.

Permission to perform error learning depends on the determination of various conditions in idle running.

First, in a step S41, it is determined whether or not an engine starter switch is ON. When it is ON, i.e. when the engine is under the starting process, the routine proceeds to a step S56, and a predetermined learning permission counter Ctrlr is set equal to a predetermined value TMRLRN#. Subsequently, a learning permission flag Flgql is reset to 0 in a step S57, and the process is terminated.

When the starter switch is not ON, the routine proceeds to a step S42, and it is determined whether or not the ignition switch is ON. When the ignition switch is not ON, i.e. when the engine has stopped, the routine also proceeds to the step S56.

When the ignition switch is ON, it is determined in a step S43 whether or not the engine is running idle.

This determination is performed, for example, by determining whether or not the accelerator opening is zero.

When the the engine is running idle, it is determined in a step S44 whether or not a vehicle speed VSP is zero. When the engine is not running idle in the step S43, the routine proceeds to the step S56.

When the vehicle speed VSP is zero in the step S44, i.e. when the vehicle is at rest, the engine rotation speed Ne is compared with the sum of the idle target rotation speed Nset and a predetermined value NLRNH# in a step S45. When the vehicle speed VSP is not zero in the step S44, the routine proceeds to the step S56. When the engine rotation speed Ne is less than this sum, the routine proceeds to a step S46, and when it is equal to or greater than this sum, the routine proceeds to the step S56.

In the step S46, the engine rotation speed Ne is compared with a value obtained by subtracting the predetermined value NLRNL# from the idle target rotation speed Nset. When the engine rotation speed Ne is larger than this value, the routine proceeds to a step S47, and when it is equal to or less than this value, the routine proceeds to the step S56.

Specifically, when the idle rotation speed lies outside a predetermined limit centered on the target idle rotation speed, the routine proceeds to the step S56.

In the step S47, a battery voltage Vb is compared with a predetermined value VBLRN#. When the battery voltage Vb is greater than the predetermined value VBLRN#, the routine proceeds to a step S48, and when it is less than the predetermined value VBLRN#, the routine proceeds to the step S56.

In the step S48, the engine cooling water temperature Tw is compared with a predetermined value TWLRNH#. When the engine cooling water temperature Tw is less than the predetermined value TWLRNH#, the routine proceeds to a step S49, and when it is equal to or greater than the predetermined value TWLRNH#, the routine proceeds to the step S56.

In the step S49, the engine cooling water temperature Tw is compared with a predetermined value TWLRNL# which is less than TWLRNH#. When the engine cooling water temperature Tw is higher than the predetermined value TWLRNL#, the routine proceeds to a step S50, and when it is equal to or less than the predetermined value TWLRNL#, the routine proceeds to the step S56. In other words, the routine proceeds to the step S56 also when the engine cooling water temperature Tw ties outside a predetermined range.

In the step S50, a fuel temperature Tf is compared with a predetermined value TFLRNH#. When the fuel temperature Tf is less than the predetermined value TFLRNH#, the routine proceeds to a step S51, and when it is equal to or greater than the predetermined value TFLRNH#, the routine proceeds to the step S56.

In the step S51, the fuel temperature Tf is compared with a predetermined value TFLRNL# which is less than TFLRNH#. When the fuel temperature Tf is higher than the predetermined value TFLRNL#, the routine proceeds to a step S52, and when it is equal to or less than the predetermined value TFLRNL#, the routine proceeds to the step S52. In other words, the routine proceeds to the step S56 also when the fuel temperature Tf lies outside a predetermined range.

In the step S52, it is determined whether or not the battery voltage Vb is higher than a predetermined value VBQLL#. This predetermined value VBQLL# is set higher than the aforesaid predetermined value VBLRN#.

When the battery voltage Vb is higher than the predetermined value VBQLL#, the routine proceeds to a step S53, and when it is equal to or less than the predetermined value VBQLL#, the routine proceeds to the step S56.

In the step S53, it is determined whether or not the power steering switch is ON. When the power steering switch is OFF, i.e., when power steering is not operating, the routine proceeds to a step S54. When the power steering switch is ON, i.e. when power steering is operating, the routine proceeds to a step S56.

In the step S54, it is determined whether or not there is an electrical load, for example whether or not the headlights or defogger is ON. When electrical loads are OFF, the routine proceeds to a step S55, and when the electrical load is ON, the routine proceeds to the step S56.

In the step S55, the learning permission state counter Ctrlr is decremented, i.e. $Ctrlr=Ctrlr_{-1}$.

In the following step S57, it is determined whether or not the counter Ctrlr is larger than zero. When the counter Ctrlr is not larger than zero, i.e., Ctrlr is zero, the routine proceeds to a step S58, and a learning permission flag Flgql is set to 1 and the process is terminated. When the counter Ctrlr is larger than zero, the routine proceeds to a step S59, the learning permission flag Flgql is reset to 0 and the process is terminated.

Due to this subroutine, when the engine is in a suitable idle running range, there are no additional loads excepting the air conditioner switch and this state has continued for a predetermined time, the learning permission flag is set to 1.

Figure 25:
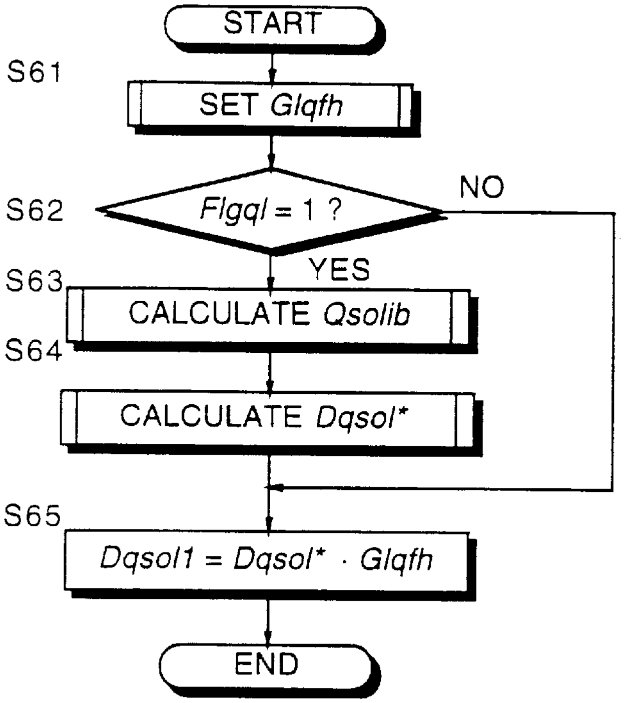
FIG. 25 is a flowchart describing a process for calculating a fuel injection amount error Dqsol1 performed by the control unit.

FIG. 25 shows a subroutine for calculating the error in the fuel injection amount, corresponding to the processing of the step S23. This subroutine is also executed at an interval corresponding to the fuel injection timing.

First, in a step S61, a learning value reflection gain Glqfh depending on the operating characteristics of the fuel injection nozzle 11 is calculated by a subroutine. This calculation is explained in detail later.

In a step S62, the learning permission flag Flgql is determined. When Flgql=1, the routine proceeds to a step S63 and when Flgql=0, the routine proceeds to a step S65.

In the step S63, a fuel injection amount Qsolib necessary to maintain the idle target rotation speed is calculated by a subroutine. This calculation is also explained later.

In a step S64, an injection amount error learning value Dqsol* is calculated by a subroutine. Finally, an error learning value reflection gain Glqfh is multiplied by the error learning value Dqsol* in a step S65 so as to calculate an injection amount error Dqsol1.

When the learning permission flag Flgql is 0, the calculation of the error learning value Dqsol* is not performed, and the injection amount error Dqsol1 is computed in the step S65 using the learning value when the process was executed on the immediately preceding occasion and learning value reflection gain correction value calculated in the step S61 on the present occasion.

Figure 26:
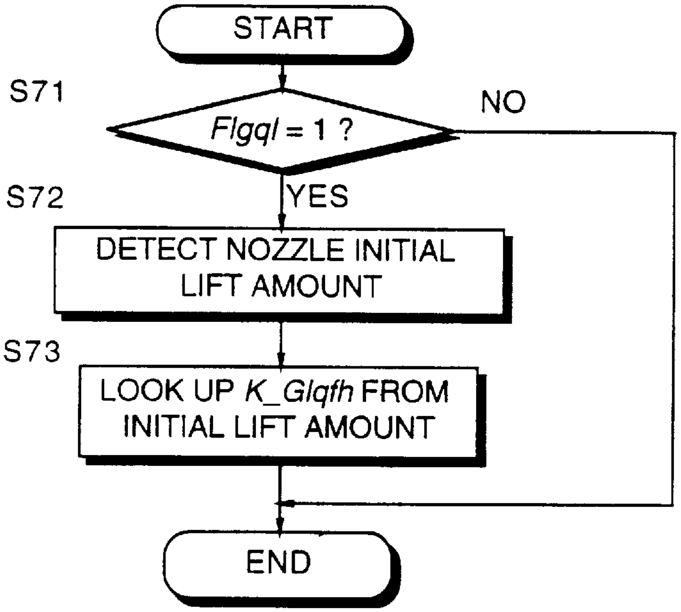
FIG. 26 is a flowchart describing a process for calculating a nozzle error correction coefficient K_Glqfh performed by the control unit.
Figure 30:
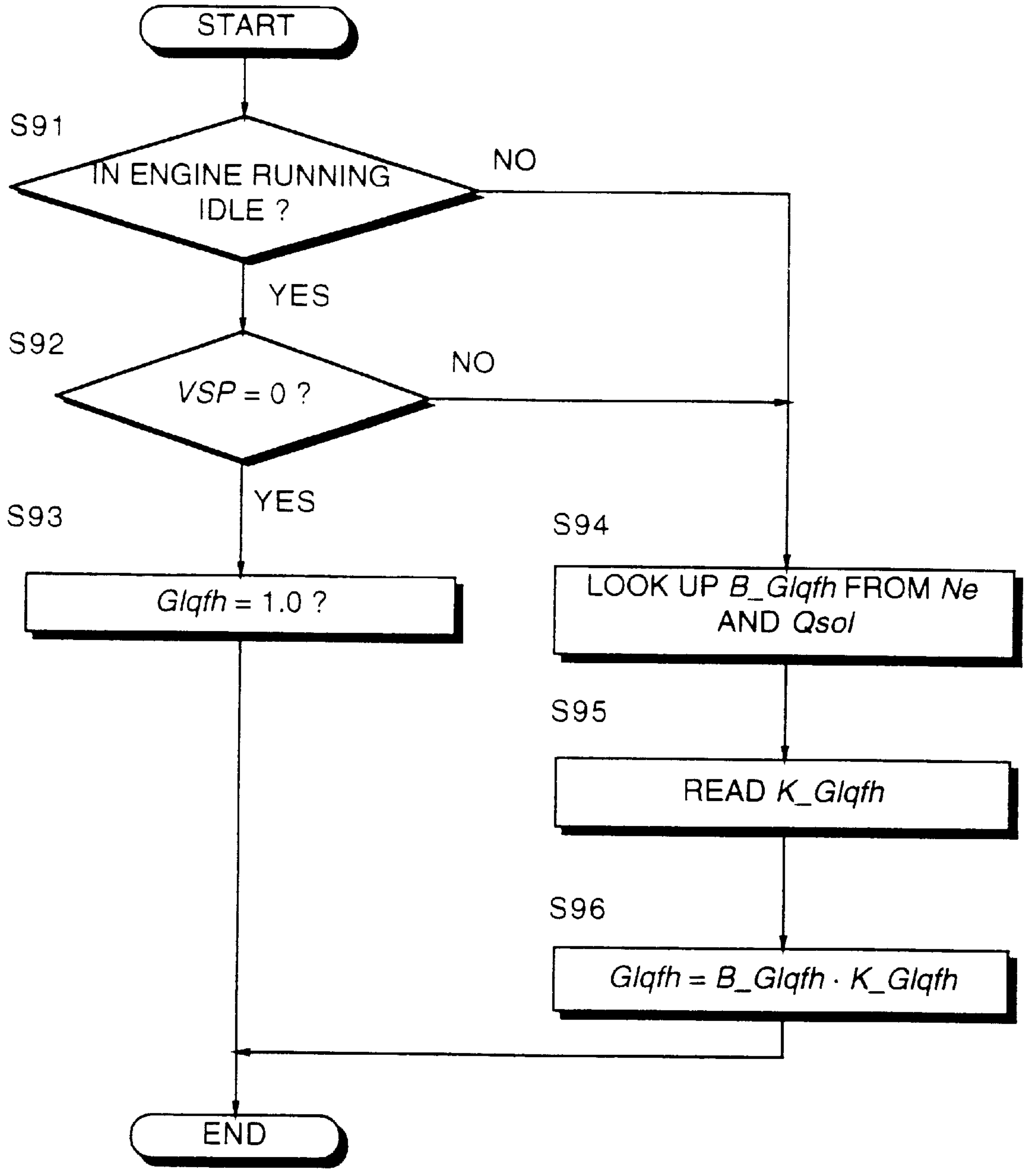
FIG. 30 is a flowchart describing a process for calculating a learning value reflection gain Glqfh performed by the control unit.

FIGS. 26 and 30 show a subroutine for setting the learning value reflection gain Glqfh in the step S61. This subroutine is performed whenever a signal is input from the nozzle lift sensor 12, i.e. whenever fuel is injected.

First, in a step S71 of FIG. 26, it is determined whether or not the learning permission flag Flgql is 1. When the learning permission flag Flgql is not 1, the process is terminated.

When the learning permission flag Flgql=1, the initial lift amount of the fuel injection nozzle 11 is detected from the output signal of the nozzle lift sensor 12 in a step S72.

In a step S73, a nozzle error correction coefficient K_Glqfh is found from the initial nozzle lift amount referring to a map and is stored in a backup RAM of the control unit 18.

Figure 27:
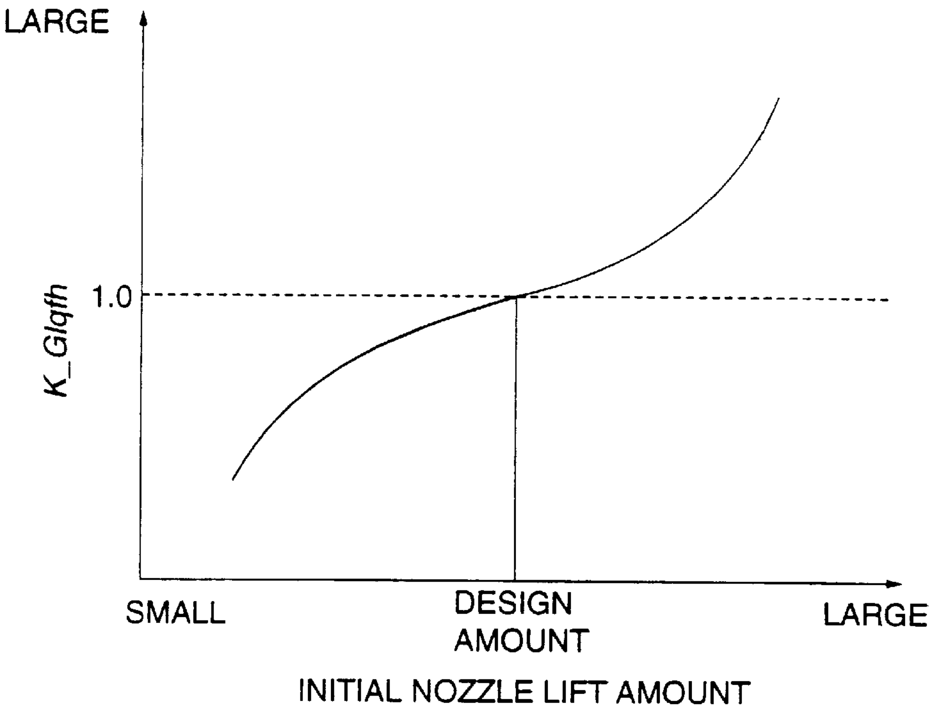
FIG. 27 is a diagram showing the relation between the nozzle error correction coefficient K_Glqfh and an initial lift amount of the fuel injection nozzle.

The nozzle error correction coefficient K_Glqfh approaches 1.0 as the initial nozzle lift amount approaches the design value, as shown in FIG. 27. This is due to the fact that the fuel injection amount is more insufficient and the injection amount error during idle running is greater the smaller the initial nozzle lift amount is relative to the design value.

When the initial nozzle lift amount is small, the fuel injection signal output to the rotary solenoid 4 is increased so as to make the real injection amount approach the target injection amount. However in the control of the EGR amount or swirl valve it is assumed that there is a predetermined relation between the fuel injection signal and fuel injection amount, and if the corrected fuel injection amount Qsol2 is used for controlling the EGR amount or the swirl valve, an error appears between an apparent injection amount and the real injection amount. Therefore when the initial nozzle lift amount is smaller than the design value, the nozzle error correction coefficient K_Glqfh needs to be smaller than 1.0. Conversely, when the initial nozzle lift amount is larger than the design value the nozzle error correction coefficient K_Glqfh needs to be larger than 1.0. When the nozzle error correction coefficient K_Glqfh is 1.0, the learning value reflection gain Glqfh is not actually corrected.

Figure 28:
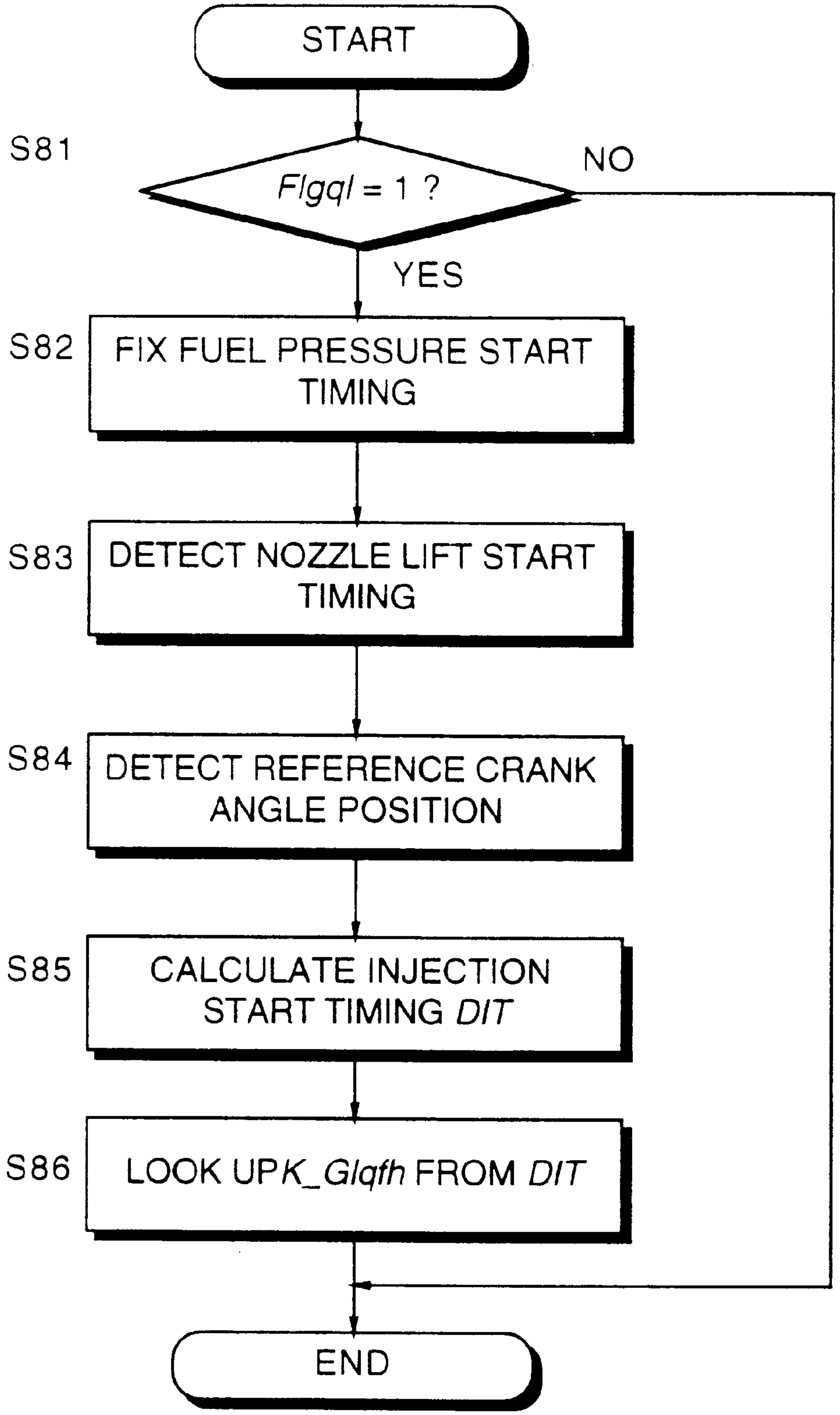
FIG. 28 is similar to FIG. 26, but showing a second embodiment of this invention.

FIG. 28 shows a subroutine that can be applied instead of the one in FIG. 26.

Herein, the nozzle error correction coefficient K_Glqfh is determined according to the opening timing of the fuel injection nozzle 11.

First, in a step S81, it is determined whether or not the learning permission flag Flgql is 1. When the learning permission flag Flgql is not 1, the process is terminated.

When the learning permission flag Flgql=1, in a step S82, a signal is output which sets a fuel pressure start timing of the fuel injection pump 1, i.e. an injection start timing, to a fixed value. This is done for example by outputting a predetermined duty signal to an electromagnetic control valve 9 so that the position of the timer piston 8 which controls the injection timing is fixed.

In a step S83, a lift start timing of the fuel injection nozzle 11 is detected from the output signal from the nozzle lift sensor 12. The lift start timing is detected as a crank angle at which the lift started.

In a step S84, a reference crank angle position of the engine is detected from the output signal from the crank angle sensor 38. In a step S85, a difference between the nozzle lift start crank angle and the reference crank angle position is calculated, and an injection start timing DIT is computed. The reference crank angle position is set to a predetermined offset angle after top dead center of the piston of the engine.

Figure 29:
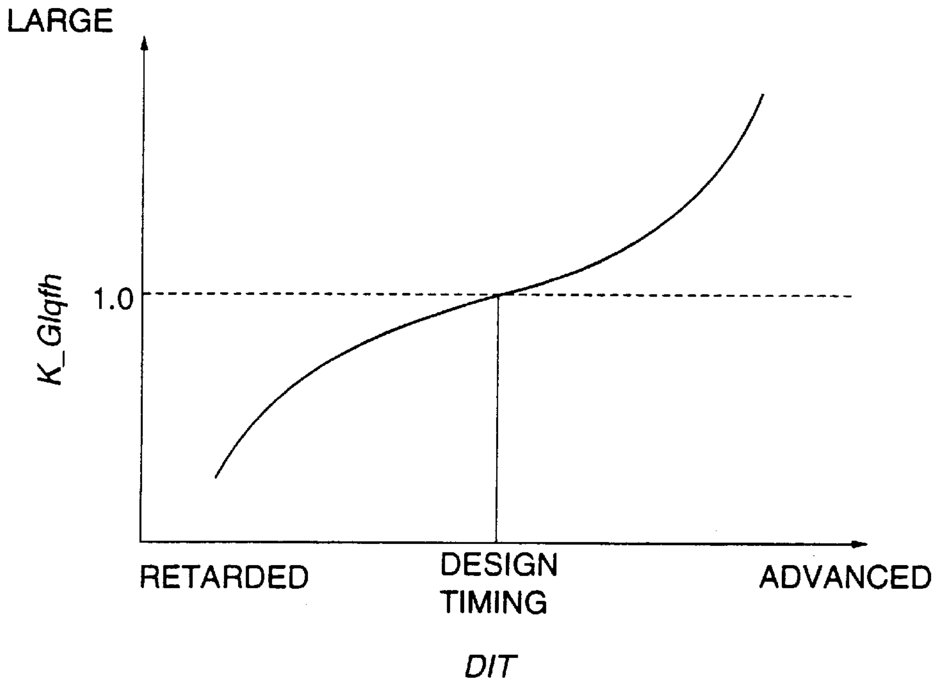
FIG. 29 is similar to FIG. 27, but showing the second embodiment of this invention.

In a step S86, the nozzle error correction coefficient K_Glqfh is found referring to a map shown in FIG. 29 based on the injection start timing DIT. The value found is stored in the backup RAM of the control unit 18.

If the timing at which fuel pressure rises is set to be constant, the nozzle opening timing is earlier and the fuel injection amount increases the lower the nozzle opening pressure.

When the nozzle opening pressure is lower than the design value, therefore, the real injection amount is larger than the standard amount.

As a result, the injection amount error during idle running also increases the earlier the lift start timing of the fuel injection nozzle 11 with respect to the design timing.

To compensate this phenomenon, the value of the basic learning value reflection gain correction coefficient K_Glqfh is set to be larger than 1.0 when the injection start timing DIT is advanced from the design timing, as shown in FIG. 29. When the injection start timing DIT is retarded from the design timing, conversely, the coefficient K_Glqfh is set to be smaller than 1.0.

FIG. 30 is a subroutine for calculating a learning value reflection gain Glqfh using the nozzle error correction coefficient K_Glqfh found by the subroutine of FIG. 26 or FIG. 28. This subroutine is executed at a fixed timing or as a background job.

In a step S91, it is determined whether or not the engine is running idle, and if it is not the routine proceeds to a step S94. When the engine is running idle, it is determined in a step S92 whether or not the vehicle speed VSP is zero. When the vehicle speed VSP is not zero, the routine proceeds to the step S94, and when it is zero, the routine is terminated with the learning value reflection gain Glqfh=1.0 in a step S93.

Figure 31:
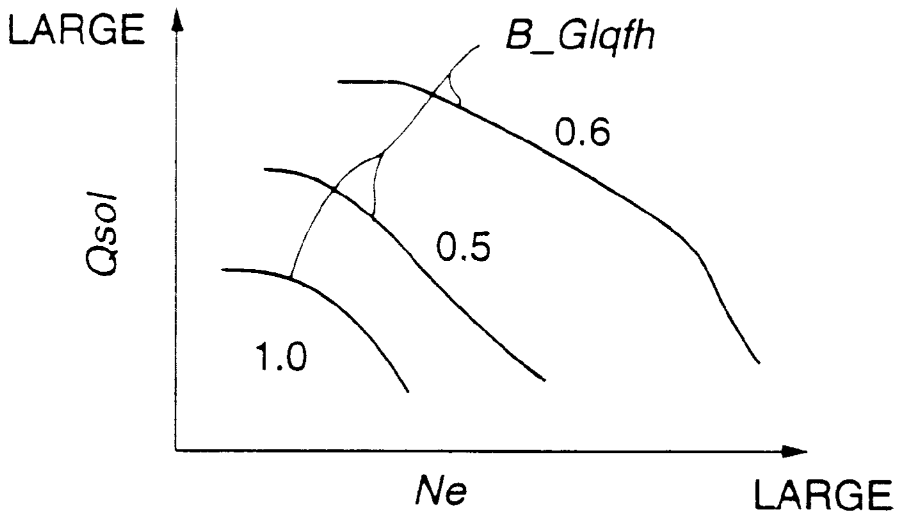
FIG. 31 is a diagram showing the contents of a map of a basic learning value reflection gain B_Glqfh stored by the control unit.

In the step S94, a basic learning value reflection gain B_Glqfh is found from the engine rotation speed Ne and the injection amount Qsol referring to a map shown in FIG. 31. The injection amount Qsol in this case is the command signal actually output from the control unit 18 to the rotary solenoid 4 on the immediately preceding occasion.

In a step S95, the above-mentioned nozzle error correction coefficient K_Glqfh is read, and in a step S96, the learning value reflection gain Glqfh is calculated by multiplying the nozzle error correction coefficient K_Glqfh by the basic learning value reflection gain B_Glqfh. The basic learning value reflection gain B_Glqfh approaches closer to 1.0 the nearer the running conditions are to the idle state, and it decreases in the high load, high rotation speed region of the engine.

Figure 32:
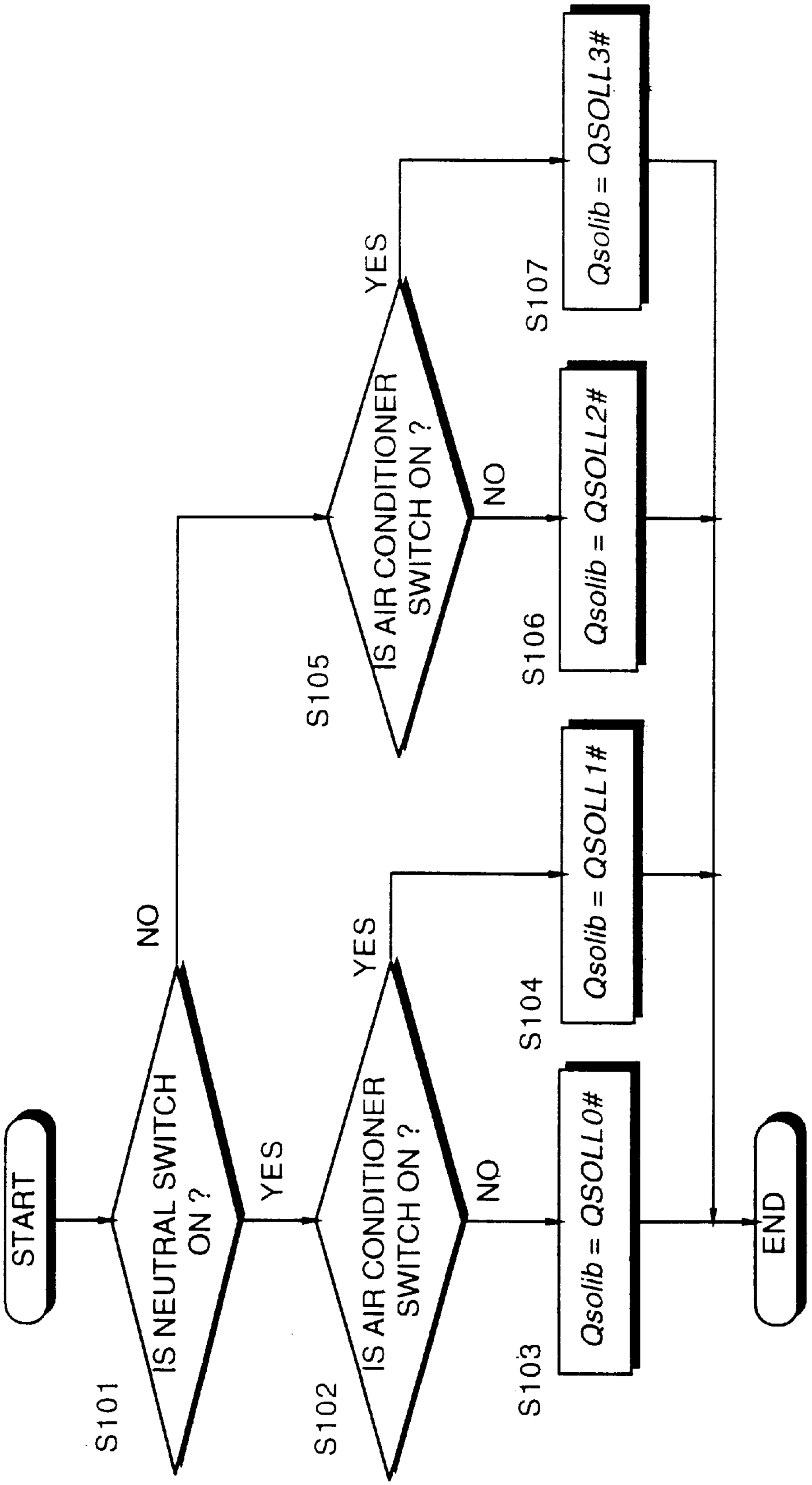
FIG. 32 is a flowchart describing a process for calculating a required fuel injection amount Qsolib performed by the control unit.

FIG. 32 shows a subroutine corresponding to the step S63 of FIG. 25. Herein, a required fuel injection amount Qsolib which is assumed when fuel is actually injected in the idle running state is calculated. This calculation is performed whenever a reference crank angle position signal is input from the crank angle sensor 38.

First, it is determined whether or not a signal from a neutral switch 33 is ON in a step S101. When it is ON, i.e. when the transmission is in the neutral position, the routine proceeds to a step S102, and when it is OFF, the routine proceeds to a step S105.

In the step S102, it is determined whether or not a signal from the air conditioner switch 34 is ON. When it is ON, i.e. when the air conditioner is operating, the routine proceeds to a step S104, and when it is OFF, the routine proceeds to a step S103.

In the step S103, the required fuel injection amount Qsolib is set to a predetermined value QSOLL0#. In the step S104, the fuel injection amount Qsolib is set to a predetermined value QSOLL1#.

On the other hand in the step S105, it is determined whether or not a signal from the air conditioner switch 34 is ON. When it is ON, i.e. when the air conditioner is operating, the routine proceeds to a step S106, and when it is OFF, the routine proceeds to a step S107.

In the step S106, the required fuel injection amount Qsolib is set to a predetermined value QSOLL2#. In the step S107, the required fuel injection amount Qsolib is set to a predetermined value QSOLL3#.

The aforesaid predetermined values QSOLL1#–QSOLL3# are preset such that the required fuel injection amount Qsolib is greater when the transmission is not in neutral than when it is in neutral, and is greater when the air conditioner is operating than when it is not. These predetermined values are design injection amounts assumed in order to keep the idle rotation speed to the target rotation speed under several loading conditions.

The reason why the required fuel injection amount Qsolib is changed according to signals from the neutral switch and air conditioner switch is because these conditions are not included in the prohibiting conditions for error learning in FIGS. 24A and 24B.

As a result, when learning is performed during idle running, the above four cases can occur depending on whether the neutral switch and air conditioner switch are ON or OFF, and the real injection amount is different in each case.

In addition to the above, the required fuel injection amount Qsolib expected under various idle running conditions may be set based on signals such as a power steering switch 31, electrical load sensor 32, fuel temperature sensor 15, cooling water temperature sensor 13, battery voltage sensor 37 and crank angle sensor 38, and learning is more stable the larger the number of conditions. It will however be understood that in order for these conditions to be included in the calculation of the fuel injection amount Qsolib, they must be excluded from the learning prohibition conditions in the process of FIGS. 24A and 24B.

Figure 33:
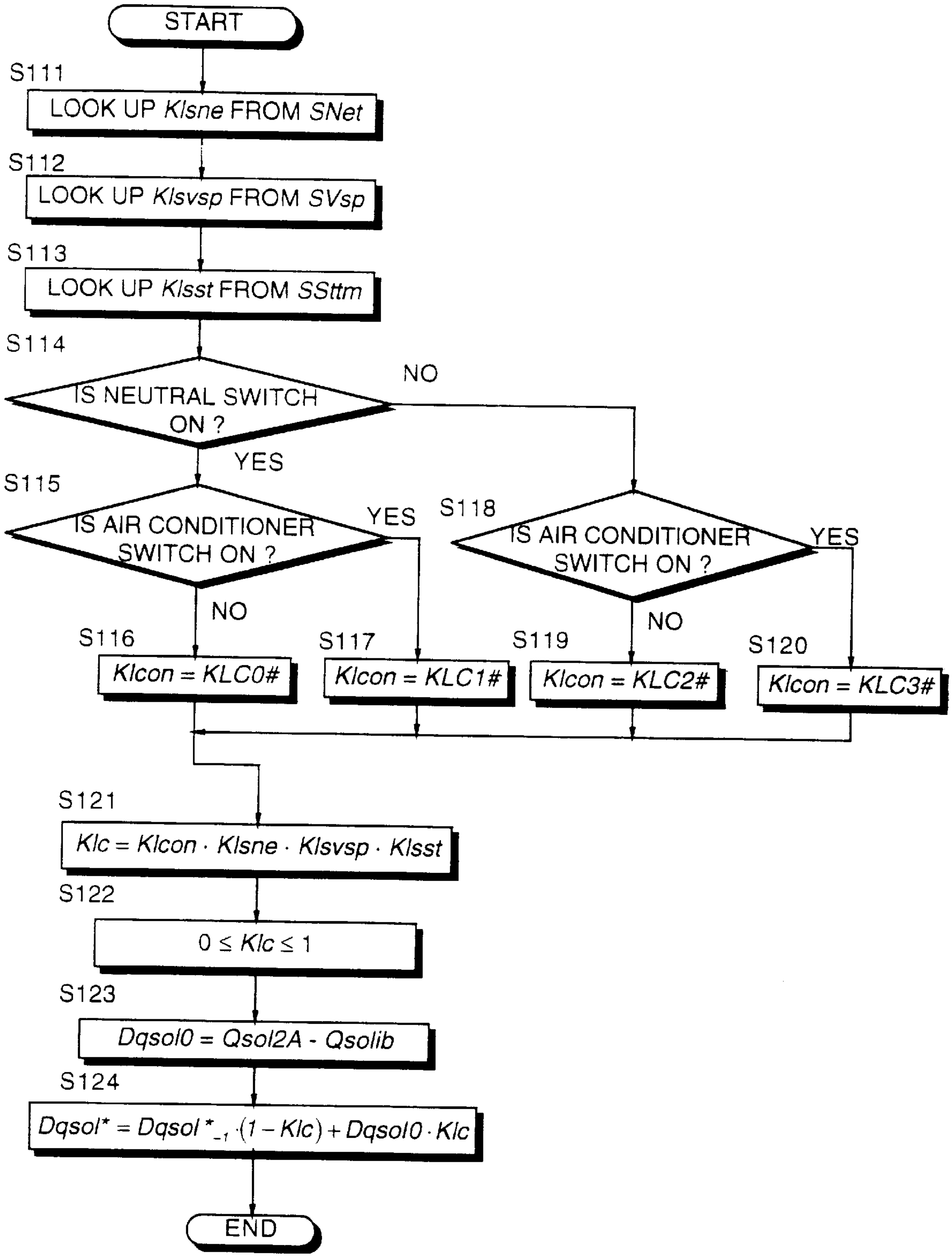
FIG. 33 is a flowchart describing a process for calculating an error learning value Dqsol* performed by the control unit.

FIG. 33 shows a subroutine corresponding to the step S64 of FIG. 25. In this subroutine, the error learning value Dqsol* is calculated. This subroutine is also performed whenever a reference crank angle position signal is input from the crank angle sensor 38.

Figure 34:
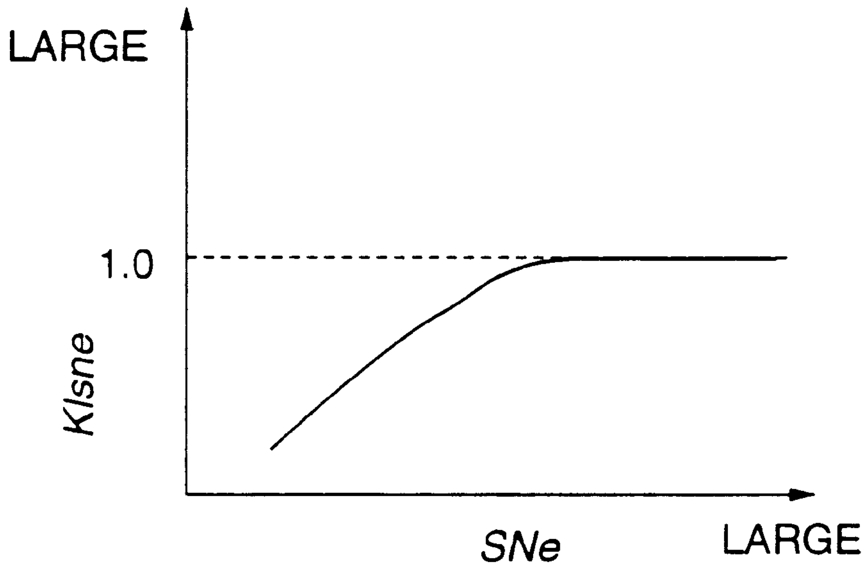
FIG. 34 is a diagram showing the contents of a map of a weighted average time constant correction coefficient Klsne stored by the control unit.

In a step S111, a weighted average time constant correction coefficient Klsne is found based on a cumulative value SNe of the engine rotation from when the engine was manufactured by looking up a map shown in FIG. 34. The weighted average time constant correction coefficient Klsne is set so as to decrease the learning gain immediately after the engine is manufactured, and apply a normal learning gain when engine operation has stabilized with time. When the cumulative value SNe reaches a predetermined value, Klsne is 1.0.

Figure 35:
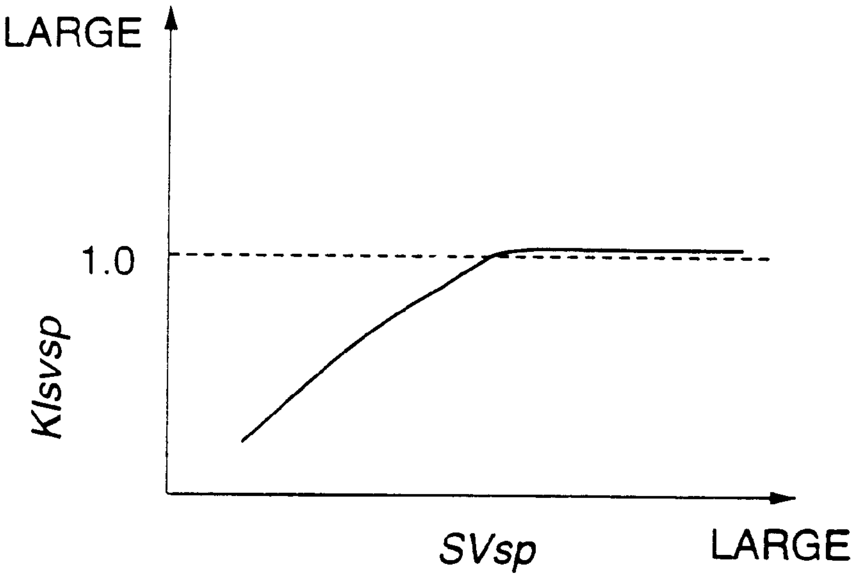
FIG. 35 is a diagram showing the contents of a map of a weighted average time constant correction coefficient Klsvsp stored by the control unit.

In a step S112, a weighted average time constant correction coefficient Klsvsp is found based on a vehicle travel distance SVsp by looking up a map shown in FIG. 35.

The weighted average time constant correction coefficient Klsvsp is a coefficient for removing unstable elements in the initial travel of the vehicle, and it is 1.0 when the mileage SVsp exceeds a predetermined value.

Figure 36:
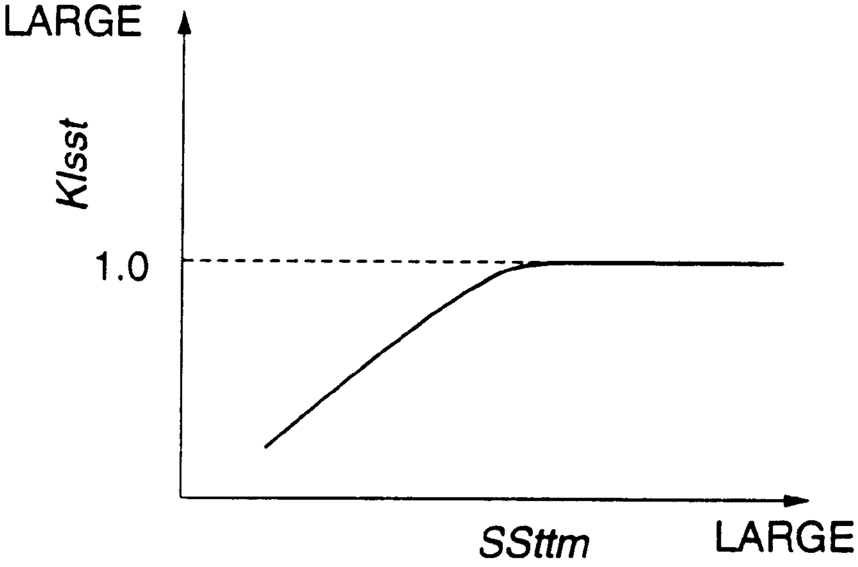
FIG. 36 is a diagram showing the contents of a map of a weighted average time constant correction coefficient Klsst stored by the control unit.

In a step S113, a weighted average time constant correction coefficient Klsst is found based on an elapsed time SSttm from when the engine was manufactured by looking up a map shown in FIG. 36.

The weighted average time constant correction coefficient Klsst is set so as to decrease the learning gain immediately after the engine is manufactured, and apply a normal learning gain when engine operation has stabilized with time. When the elapsed time SSttm reaches a predetermined value, Klsst is 1.0.

It may however be unnecessary to apply all of these correction coefficients Klsne, Klsvsp, Klsst, since even if only one is applied, various elements of instability in the initial traveling state of the vehicle can still be eliminated.

In a step S114, it is determined whether or not the signal from the neutral switch 33 is ON, and when it is ON, the routine proceeds to a step S115. When it is OFF, the routine proceeds to a step S118. In these steps, it is determined whether or not a signal from the air conditioner switch 34 is ON.

When the signal from the air conditioner switch 34 is ON in the step S115, a weighted average time constant basic value Klcon is set to a predetermined value KLC0# in a step S116. When it is OFF, the weighted average time constant basic value Klcon is set to a predetermined value KLC1# in a step S117.

When the signal from the air conditioner switch 34 is ON in a step S118, the weighted average time constant basic value Klcon is set to a predetermined value KLC2# in a step S119. When it is OFF, the weighted average time constant basic value Klcon is set to a predetermined value KLC3# in a step S120.

The reason why the learning gain is individually adjusted according to the operation of the transmission and the air conditioner is in order to reduce the error of learning due to differences of these conditions.

In a step S121, a weighted average time constant value Klc is calculated by multiplying the weighted average time constant basic value Klcon by the correction coefficients Klsne, Klsvsp and Klsst.

In a step S122, the weighted average time constant value Klc is limited so that it is no less than 0 and no greater than 1. Specifically, when it lies outside this range, the weighted average time constant value Klc is modified so that it has a minimum value of 0 and a maximum value of 1.

In a step S123, a difference Dqsol0 between the corrected fuel injection value Qsol2A and required fuel injection amount Qsolib is calculated.

Figure 7:
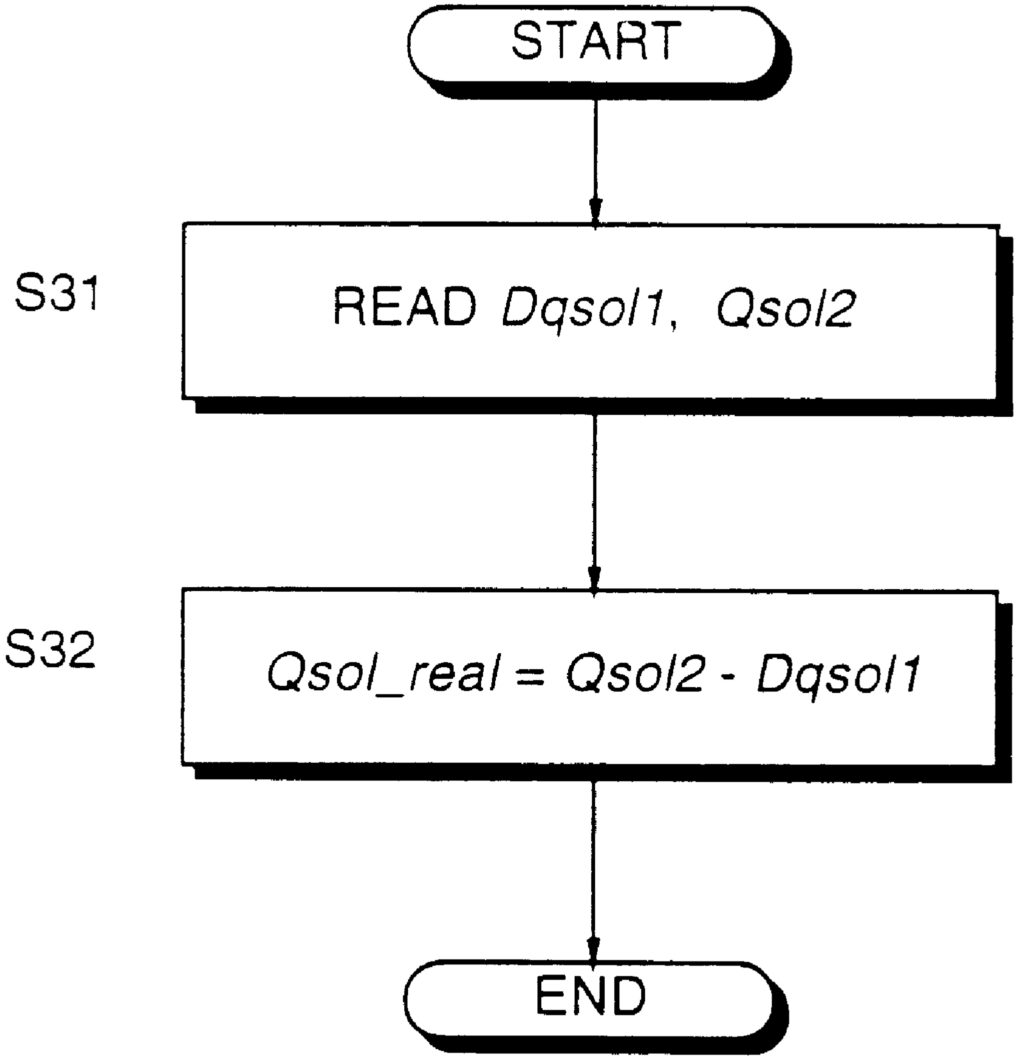
FIG. 7 is a flowchart describing a subroutine for calculating the estimated real injection amount Qsol_real used in the flowchart of FIG. 6.

In a step S124, an error learning value Dqsol* is found by the following equation using this difference Dqsol0 and the weighted average time constant corresponding value Klc.

$$Dqsol^{*}=Dqsol^{*}_{-1}(1-Klc)+Dqsol0\cdot Klc$$

where,

Dqsol*$_{-1}$=immediately preceding value of Dqsol*,

FIG. 7 shows a subroutine corresponding to the step S24. This is a subroutine for calculating the estimated real injection amount Qsol_real, and it is executed whenever a reference crank angle position signal is input from the crank angle sensor 38.

First, in a step S31, the injection amount error Dqsol1 and corrected fuel injection amount Qsol2 are read. Next, in a step S32, the estimated real injection amount Qsol_real is calculated by deducting the injection amount error Dqsol1 from the injection amount correction value Qsol2. Using this estimated real injection amount Qsol_real, various controls including control of the EGR amount are performed.

Next, processes for controlling the EGR rate, fuel injection timing and intake air swirl using the estimated real injection amount Qsol_real will be described referring to FIG. 8 to FIG. 15. These processes are also executed by the control unit 18.

Figure 8:
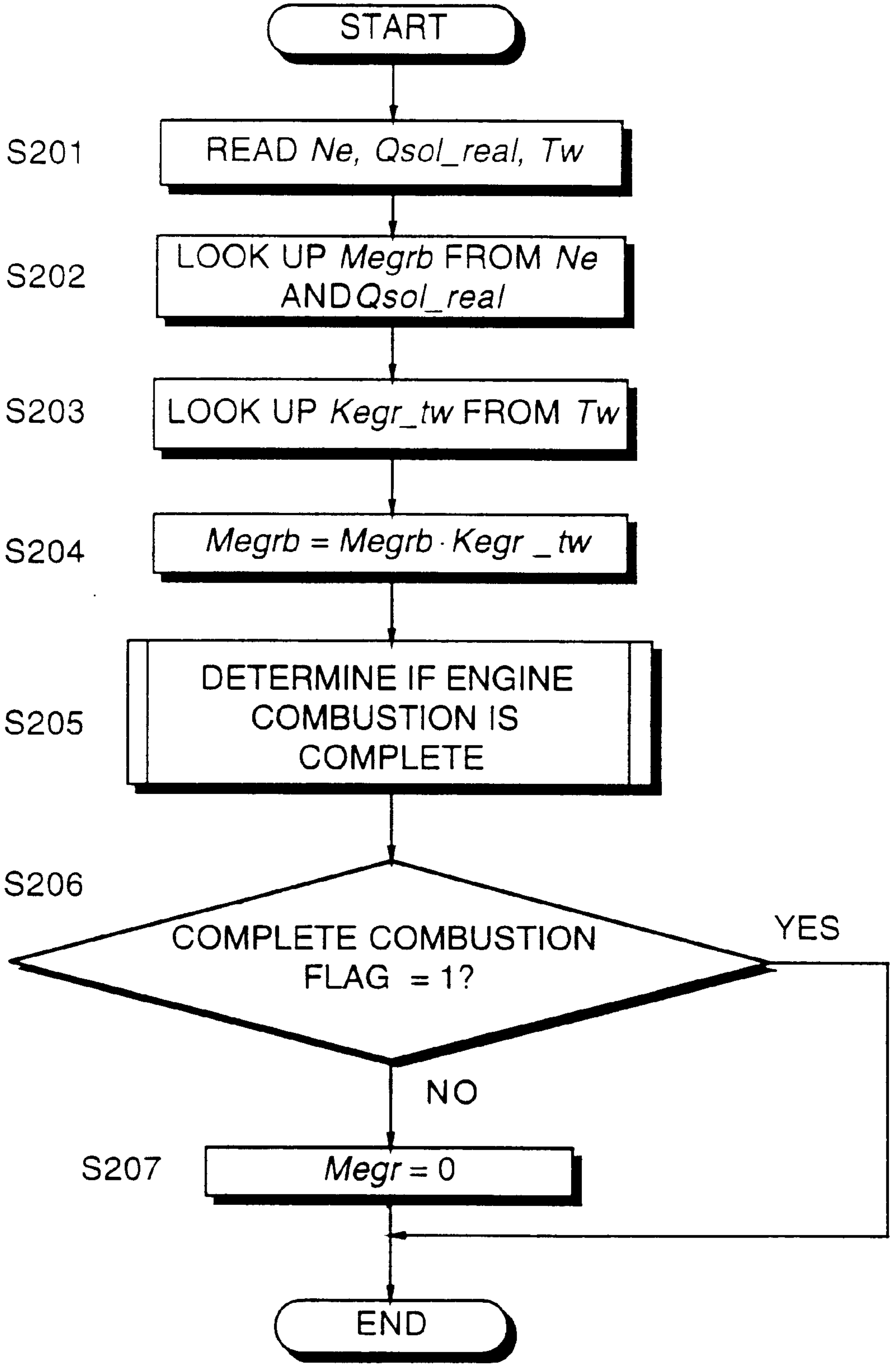
FIG. 8 is a flowchart describing a process for calculating a target exhaust recirculation rate performed by the control unit using the estimated real injection amount Qsol_real.

FIG. 8 is a process for setting the target EGR rate using the estimated real injection amount Qsol_real. This process is executed whenever a reference crank angle position signal is input from the crank angle sensor 38.

In a step S201, the engine rotation speed Ne, estimated real injection amount Qsol_real and engine cooling water temperature Tw are read.

Figure 9:
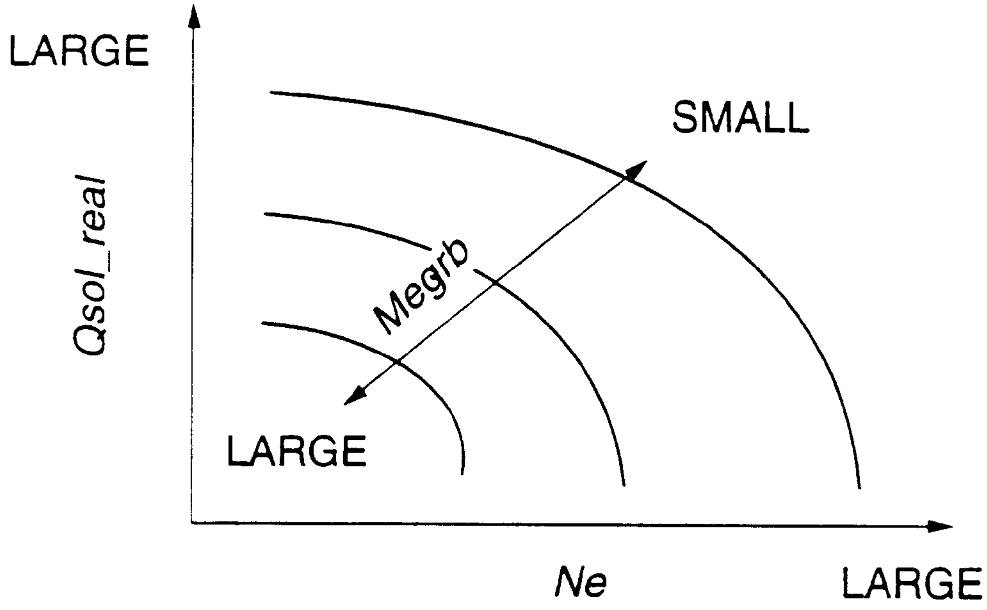
FIG. 9 is a diagram showing a relation between an engine rotation speed Ne, the estimated real injection amount Qsol_real and the target exhaust recirculation rate.

In a step S202, a basic target EGR rate Megrb is found based on the engine rotation speed Ne and estimated real injection amount Qsol_real by looking up a map shown in FIG. 9. As shown by this map, the target EGR rate is set to be large in the region where the engine is frequently used, i.e. at low rotation speed and low load (low injection amount), and set to be small in the high output region when smoke tends to be generated easily.

Figure 10:
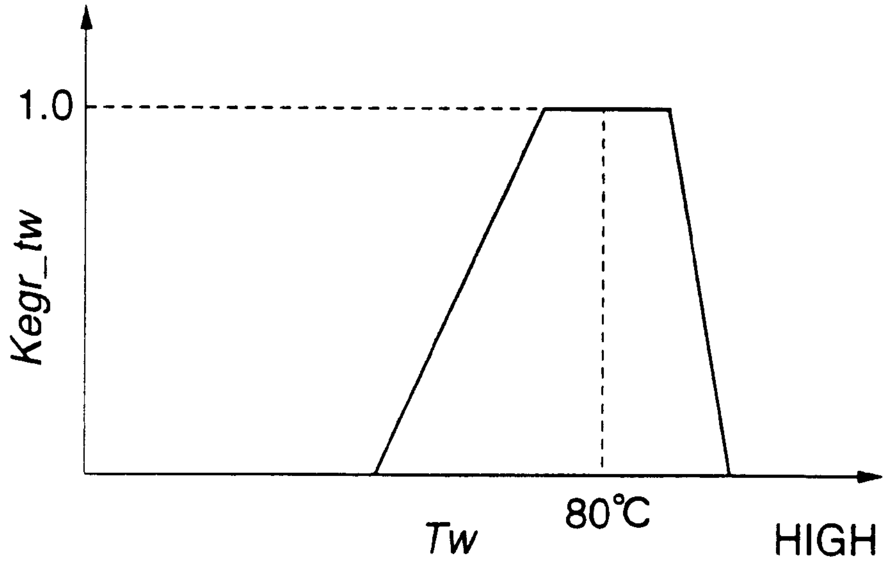
FIG. 10 is a diagram showing a relation between an engine cooling water temperature Tw and a correction coefficient Kegr_tw of the target exhaust recirculation rate.

In a step S203, a correction coefficient Kegr_tw for correcting the target EGR rate is found based on the cooling water temperature Tw by looking up a map shown in FIG. 10.

In a step S204, a target EGR rate Megr is computed by the following equation from the basic target EGR rate and the correction coefficient Kegr_tw.

$$Megrb = Megrb \cdot Kegr\_tw$$

Figure 11:
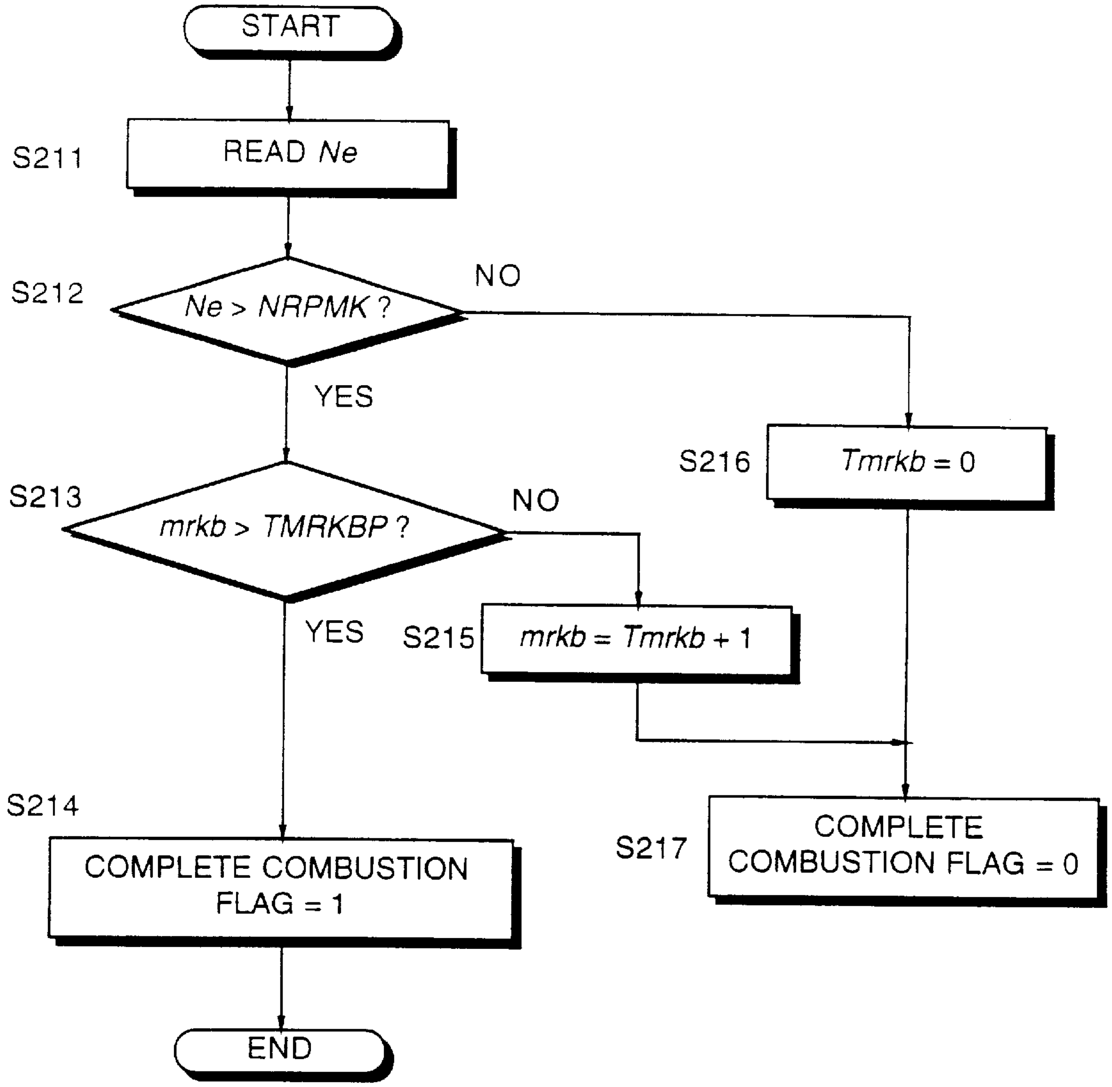
FIG. 11 is a flowchart describing a full engine combustion determining subroutine used in the flowchart of FIG. 8.

In a step S205, it is determined by a subroutine shown in FIG. 11 whether or not engine combustion is complete.

In a step S206, a complete combustion flag set by this subroutine is determined, and when combustion is complete, i.e., the complete combustion flag=1, the process is terminated.

When it is determined that combustion is not complete, i.e., the complete combustion flag=0, the target EGR rate Megr is set to 0 in a step S207 and the process is then terminated. In other words, control of EGR rate is performed only when engine combustion is complete. Before combustion is complete, EGR itself is not performed so as to allow stable engine startup.

The subroutine of FIG. 11 is executed for example at an interval of ten milliseconds.

First, the engine rotation speed Ne is read in step S211, and is compared with a completion determining slice level NRPMK corresponding to a complete combustion rotation speed in a S212. When the engine rotation speed is higher than the slice level, the routine proceeds to a step S213. Here, a counter value Tmrkb indicating elapsed time after determining complete combustion is compared with a predetermined time TMRKBP, and when the counter value Tmrkb is higher than the predetermined time TMRKBP, the routine proceeds to a step S214, a complete combustion flag is set to 1 and processing is terminated.

When the engine rotation speed Ne is equal to or less than the slice level NRPMK, the counter value Tmrkb is cleared to 0 in a step S216, the complete combustion flag is reset to 0 in a step 3217, and the process is terminated.

When the counter value is equal to or less than the predetermined time TMRKBP in the step S213, the counter value is incremented in a step S215, the complete combustion flag is reset to 0 in the step S217, and the process is terminated.

Due to this subroutine, it is determined that combustion is complete when the engine rotation speed is for example equal to or greater than 400 rpm, and this state has persisted for a predetermined time.

Figure 12:
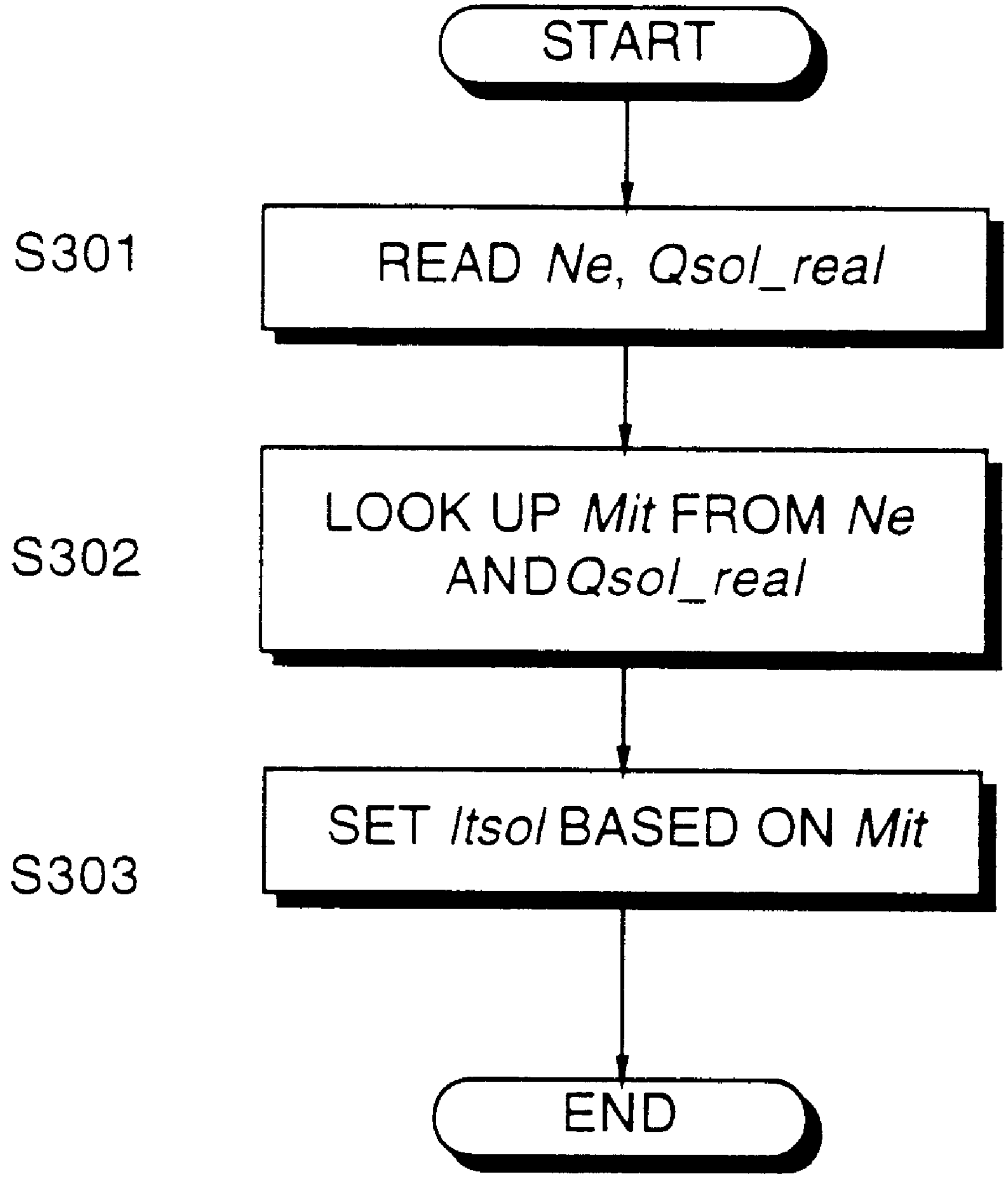
FIG. 12 is a flowchart for describing a process for setting a fuel injection timing performed by the control unit using the estimated real injection amount Qsol_real.

FIG. 12 shows a process for setting a fuel injection timing using the estimated real injection amount Qsol_real. This process is also executed for example at an interval of ten milliseconds.

In a step S301, the engine rotation speed Ne and estimated real injection amount Qsol_real are read.

Figure 13:
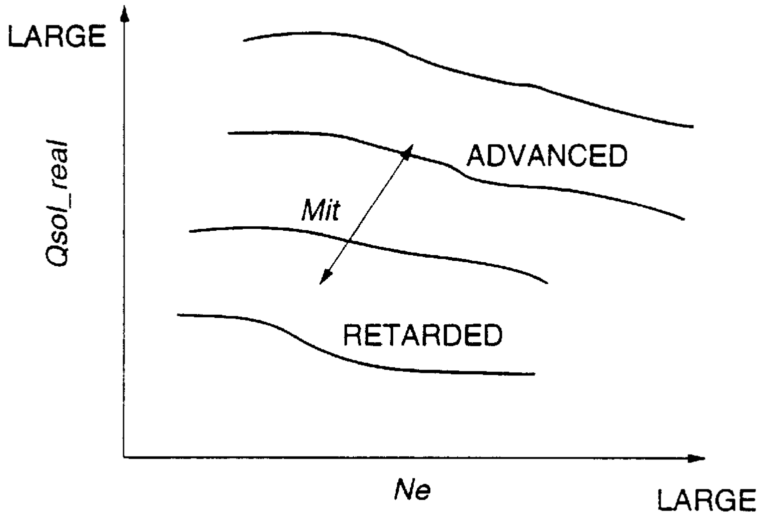
FIG. 13 is a diagram showing a relation between the engine rotation speed Ne, estimated real injection amount Qsol_real and target fuel injection timing Mit.

In a step S302, a target fuel injection timing Mit is calculated based on the engine rotation speed Ne and estimated real injection amount Qsol_real by looking up a fuel injection timing map shown in FIG. 13.

In a step S303, a final target fuel injection timing ltsol is set by applying various corrections to the target injection timing Mit, and the process is terminated.

Figure 14:
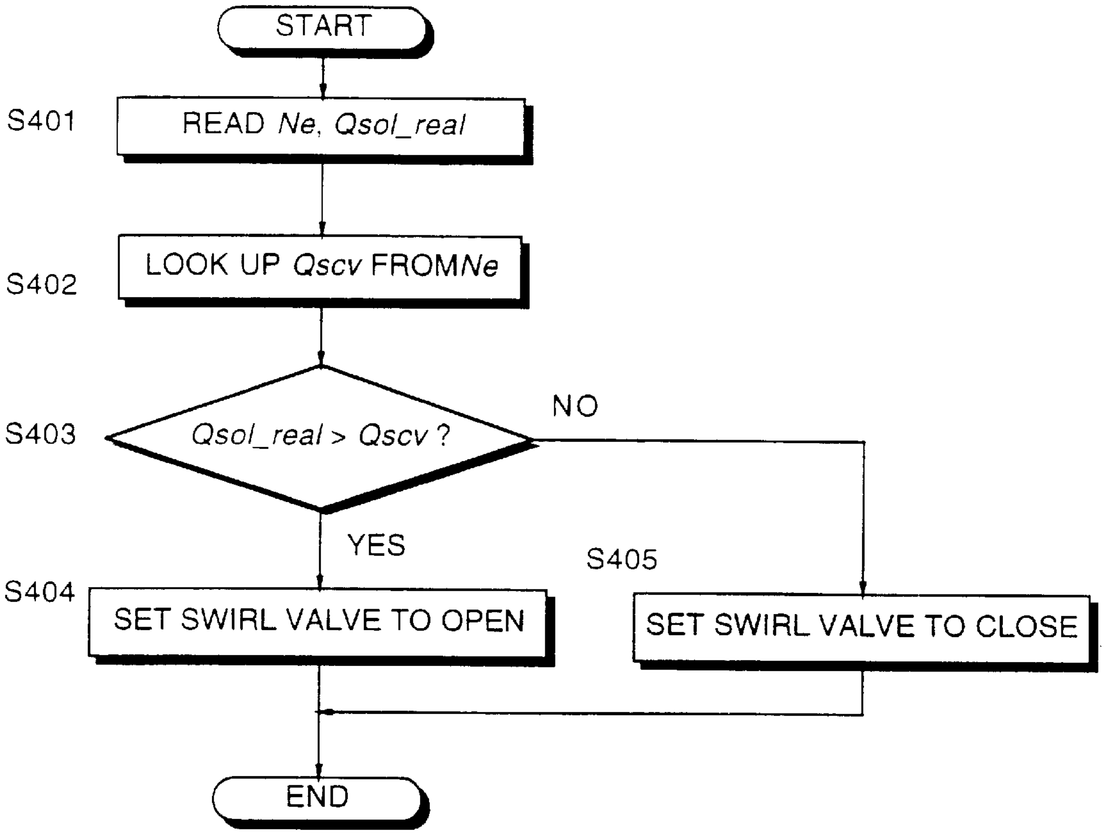
FIG. 14 is a flowchart describing a process for controlling a swirl control-valve performed by the control unit using the estimated real injection amount Qsol_real.

FIG. 14 shows a process for controlling the opening and closing the swirl control-valve using the estimated real injection amount Qsol_real. This process is also executed at an interval of, for example, ten milliseconds.

In a step S401, the engine rotation speed Ne and estimated real injection amount Qsol_real are read.

Figure 15:
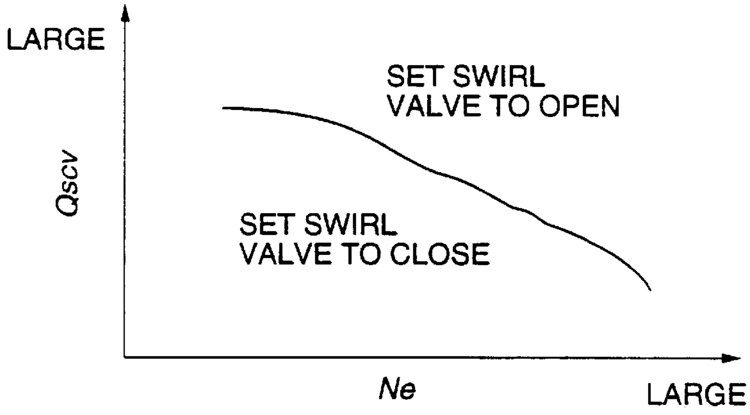
FIG. 15 is a diagram showing a relation between the engine rotation speed Ne, estimated real injection amount Qsol_real and a slice level Qscv.

In a step S402, a swirl control valve change-over slice level Qscv is found based on the engine rotation speed Ne by looking up a map shown in FIG. 15.

In a step S403, the estimated real injection amount Qsol_real and slice level Qscv are compared, and when the estimated real injection amount Qsol_real exceeds the slice level, the swirl control valve is set to open in a step S404.

On the other hand, when Qsol_real is equal to or less than the slice level, the swirl control valve is set to close in a step S405, and processing is terminated.

Figure 16:
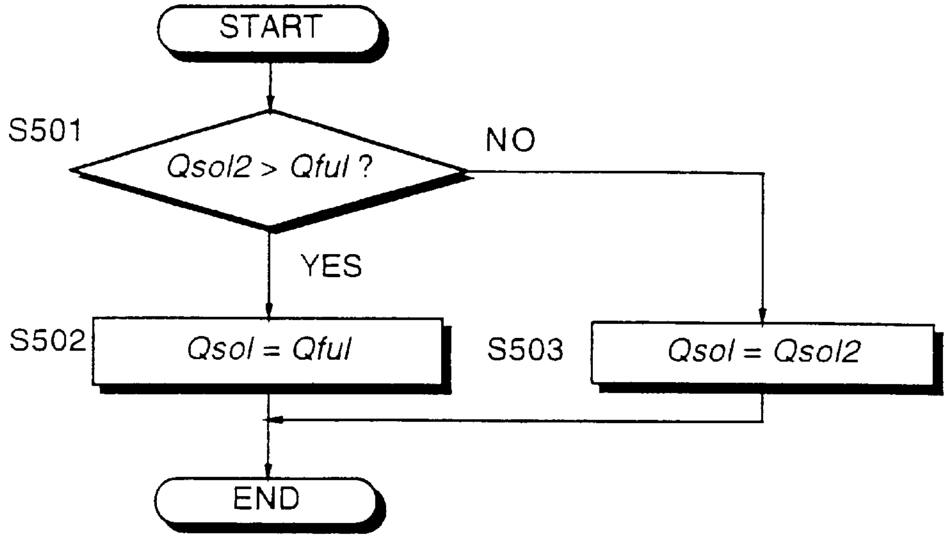
FIG. 16 is a flowchart describing a process for setting the injection amount performed by the control unit.

FIG. 16 shows a process for determining the fuel injection amount Qsol of the engine. This process is executed in synchronism with the engine rotation.

In a step S501, the corrected fuel injection amount Qsol2 is compared with an allowable maximum injection amount Qful. The allowable maximum injection amount Qful is found by a subroutine shown in FIGS. 18 and 19.

When the corrected fuel injection amount Qsol2 is equal to or greater than the allowable maximum injection amount Qful, the fuel injection amount Qsol is set equal to the allowable maximum injection amount Qful in a step S502, and the process is terminated.

When the corrected fuel injection amount Qsol2 is less than the maximum injection amount Qful, the fuel injection amount Qsol is set equal to the corrected fuel injection amount Qsol2 in a step S503 and the process is terminated.

Figure 17:
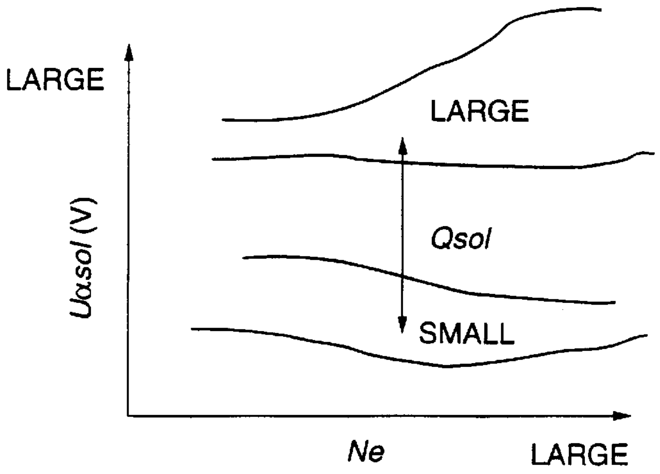
FIG. 17 is a diagram showing the contents of a map of a fuel injection amount Qsol stored by the control unit.

FIG. 17 shows a map stored in the control unit 18 for converting the fuel injection amount Qsol to a signal output to the rotary solenoid 4.

As shown in this map, an output signal (voltage signal) Uαsol increases the larger the fuel injection amount Qsol.

Figure 18:
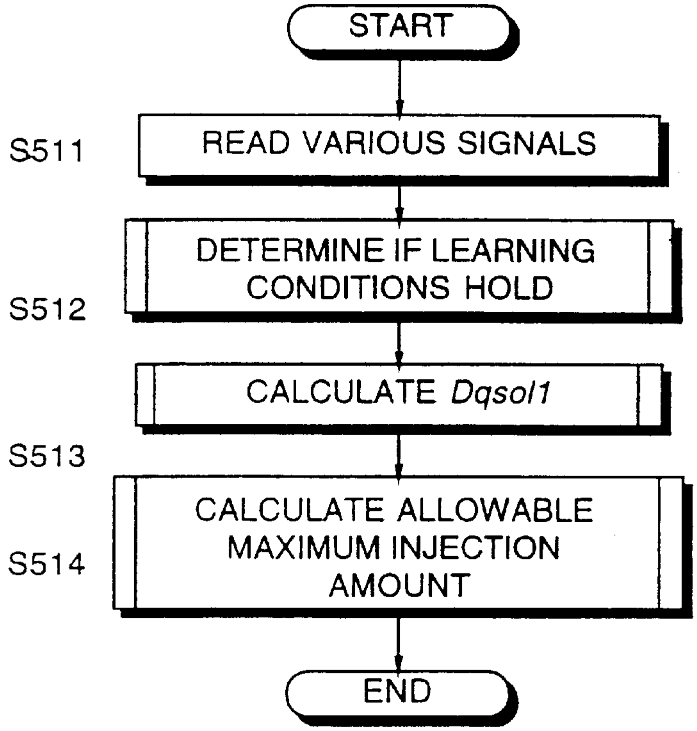
FIG. 18 is a flowchart describing a process for calculating an allowable maximum fuel injection amount performed by the control unit.

FIG. 18 shows a subroutine for calculating the allowable maximum injection amount Qful. This subroutine is performed whenever a signal is input from the nozzle lift sensor 12, i.e. whenever there is a fuel injection.

First, in a step S511, signals from various sensors and switches are read.

In a step S512, an error learning permission determination is performed, and an injection amount error Dqsol1 is calculated in a step S513. This processing is the same as that performed in the steps S22 and S23 of FIG. 6 described hereabove.

Figure 19:
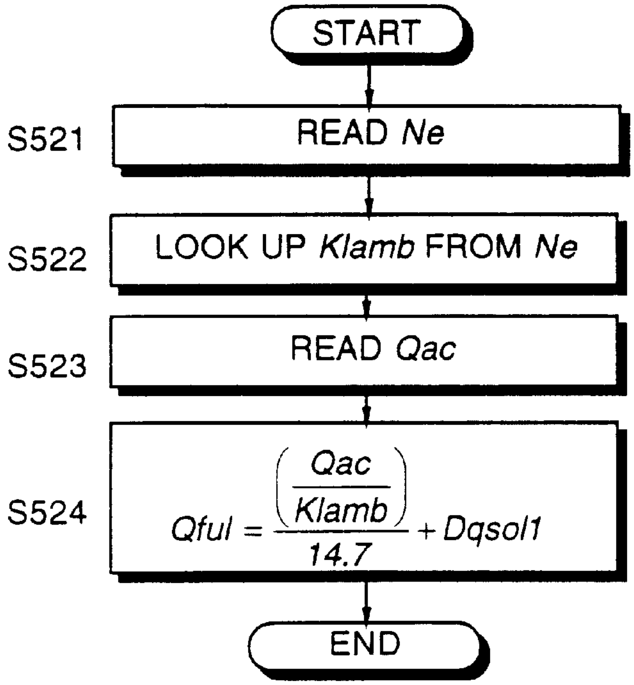
FIG. 19 is a flowchart describing a subroutine for calculating the permitted maximum fuel injection amount used in the flowchart of FIG. 18.

In a step S514, the allowable maximum injection amount is calculated by the subroutine shown in FIG. 19, and the process is terminated. The subroutine shown in FIG. 19 is also performed whenever a signal is input from the nozzle lift sensor 12.

In a step S521 the engine rotation speed Ne is read.

Figure 20:
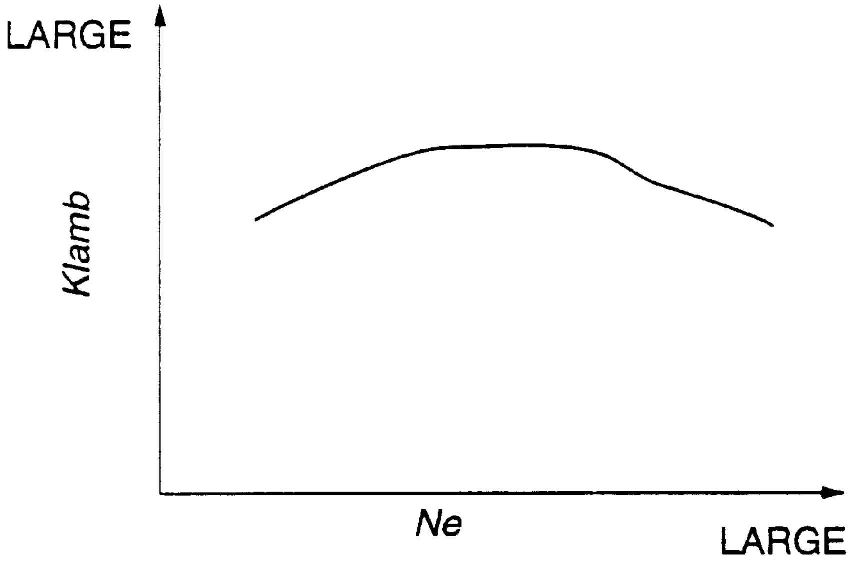
FIG. 20 is diagram showing the contents of a map of a critical excess air coefficient Klamb stored by the control unit.

In the step S522, the critical excess air coefficient Klamb is set by looking up a map shown in FIG. 20 based on the engine rotation speed Ne.

In the step S523, an intake air amount Qac per cylinder is read, the maximum injection amount is calculated in the step S524 by the following equation using Qac, Klamb and the injection amount error Dqsol1, and the process is terminated.

$$Qful = \frac{\left(\frac{Qac}{Klamb}\right)}{14.7} + Dqsol1$$

Figure 21:
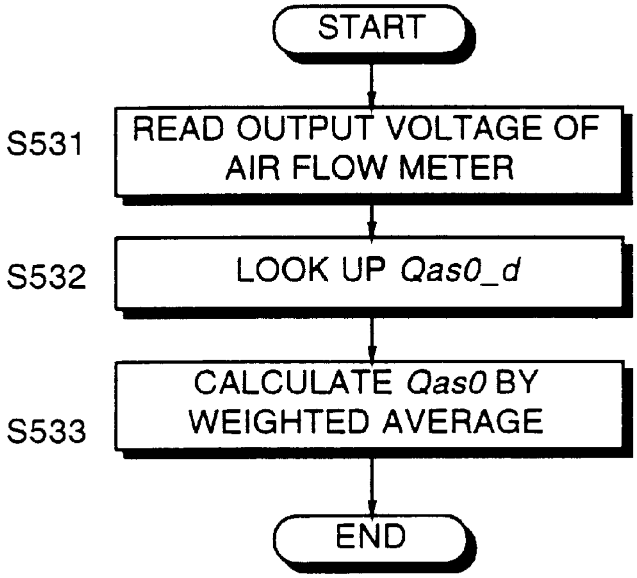
FIG. 21 is a flowchart describing a process for detecting an intake air amount performed by the control unit.

FIG. 21 shows a subroutine for calculating the intake air amount Qac per cylinder. This process is executed at an interval of, for example, four milliseconds.

Figure 22:
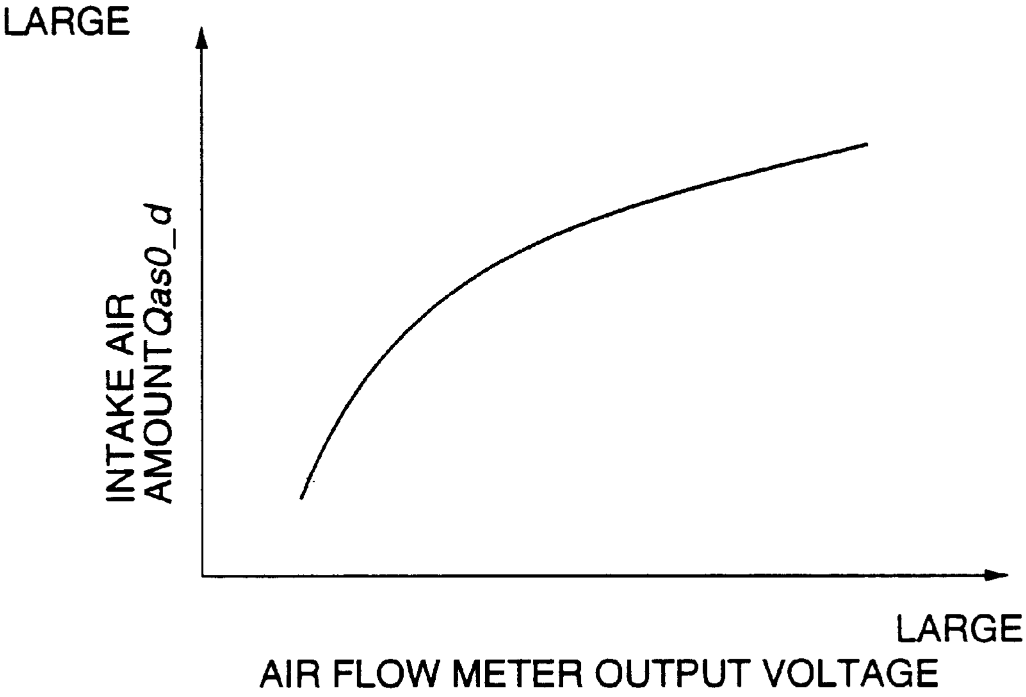
FIG. 22 is a diagram showing the contents of a map of intake air amount stored by the control unit.

In a step S531, the output voltage of the air flow meter 39 is read. In a step S532, the output voltage is converted to an intake air amount Qas0_d by referring to a map shown in FIG. 22.

In a step S533, weighted average processing is applied to the intake air amount Qas0_d so as to calculate an intake air amount Qas0, and the process is terminated.

Figure 23:
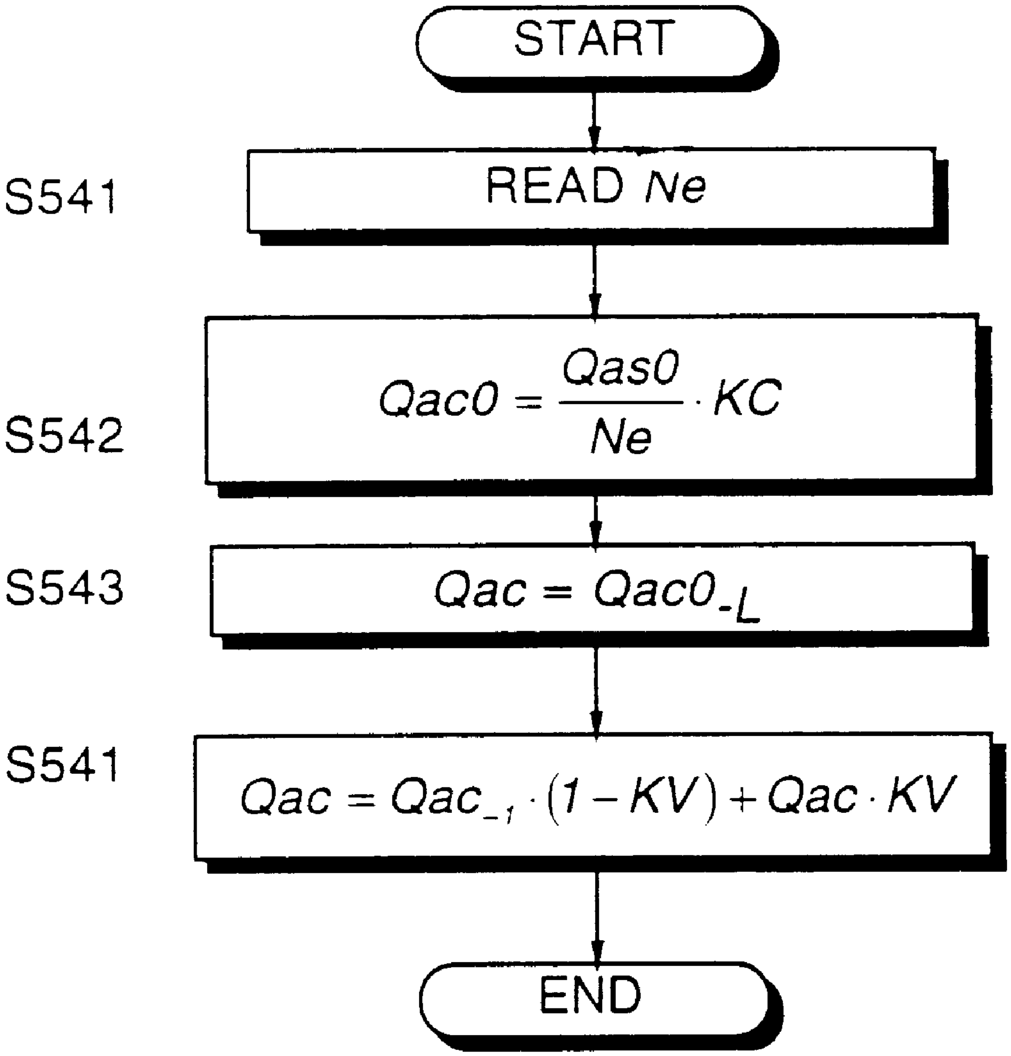
FIG. 23 is a flowchart describing a process for calculating a cylinder intake air amount performed by the control unit.

FIG. 23 shows a process for calculating the cylinder inflow air capacity Qac based on the intake air amount Qas0. This process is executed whenever a signal is input from the nozzle lift sensor 12.

In a step S541, the engine rotation speed Ne is read.

In a step S542, an intake air amount Qac0 per intake stroke is calculated by the following equation from the intake air amount Qas0 and engine rotation speed Ne.

$$Qac0 = \frac{Qas0}{Ne} \cdot KC$$

where,

KC=constant.

In a step S543, delay processing, corresponding to the time required for air to flow from the air flow meter 39 to an intake collector, not shown, of the engine, is performed by setting Qac=Qac0$_{-L}$, where L is a constant.

In a step S544, delay processing in the collector is performed by the following equation so as to compute the intake air amount Qac per cylinder.

$$Qac = Qac_{-1}(1-KV) + Qac \cdot KV$$

where, $Qac_{-1}$=immediately preceding value of Qac,

KV=constant.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

1. A fuel injection device for performing fuel injection in a diesel engine from a fuel injection nozzle based on a command signal Qsol2, comprising:

a sensor for detecting an engine running state, means for calculating said command signal Qsol2 based on said engine running state, means for calculating a predetermined fuel injection amount Qsolib necessary to maintain an idle running state according to a loading condition of said engine, means for calculating a specific value Qsol2A corresponding to said command signal Qsol2 when the engine is in said idle running state, means for calculating an error learning value Dqsol* in an engine idle running state based on a difference Dqsol0 between said specific value Qsol2A and said predetermined fuel injection amount Qsolib, means for calculating an injection amount error Dqsol1 from said error learning value Dqsol*, and means for calculating an estimated real injection amount Qsol_real from said command signal Qsol2 and said injection amount error Dqsol1.

2. A fuel injection device for performing fuel injection in a diesel engine from a fuel injection nozzle based on a command signal Qsol2, comprising:

a sensor for detecting an engine running state, and a microprocessor programmed to:

calculate said command signal Qsol2 based on said engine running state, calculate a predetermined fuel injection amount Qsolib necessary to maintain an idle running state according to a loading condition of said engine, calculate a specific value Qsol2A corresponding to said command signal Qsol2 when the engine is in said idle running state, calculate an error learning value Dqsol* in an engine idle running state based on a difference Dqsol0 between said specific value Qsol2A and said predetermined fuel injection amount Qsolib, calculate an injection amount error Dqsol1 from said error learning value Dqsol*, and calculate an estimated real injection amount Qsol_real from said command signal Qsol2 and said injection amount error Dqsol1.

3. A fuel injection device as defined in claim 1, wherein said engine is used to drive a vehicle equipped with an air conditioner and said loading condition comprises the condition of whether or not the air conditioner is operating.

4. A fuel injection device as defined in claim 1, wherein said engine is used to drive a vehicle equipped with a transmission and said loading condition comprises the condition of whether or not the transmission is in a neutral position.

5. A fuel injection device as defined in claim 1, wherein said engine is used to drive a vehicle, and said microprocessor is further programmed to calculate said error learning value Dqsol* by the following equation [3]:

$$Dqsol^* = Dqsol^*_{-1} \cdot (1-Klc) + Dqsol0 \cdot Klc \quad [3]$$

where, $Dqsol^*_{-1}$=immediately preceding value of Dqsol*,

Klc=time constant representing at least any one of cumulative engine rotation, distance travelled by vehicle and cumulative engine operating time, Dqsol0=difference between specific value Qsol2A and predetermined value Qsolib.

6. A fuel injection device as defined in claim 1, wherein said microprocessor is further programmed to store said error learning value Dqsol* and determine whether or not an error learning condition holds for learning an error in a fuel injection amount based on said engine running state, and calculate said injection amount error Dqsol1 based on a stored error learning value Dqsol* when said condition does not hold.

7. A fuel injection device as defined in claim 6, wherein said error learning condition comprises the conditions that an engine rotation speed lies within an idle rotation speed region, and that a state where the engine is not under a load of a certain auxiliary device continues for a predetermined time.

8. A fuel injection device as defined in claim 1, wherein said device further comprises a sensor for detecting an operating state of said fuel injection nozzle, and said microprocessor is further programmed to calculate a nozzle error correction coefficient K_Glqfh from the operating state of the fuel injection nozzle when the engine is in said idle running state, and calculate an injection amount error Dqsol1 from said error learning value Dqsol* and said nozzle error correction coefficient K_Glqfh.

9. A fuel injection device as defined in claim 8, wherein said nozzle operating state detecting sensor comprises a sensor for detecting a lift amount of said fuel injection nozzle, and said microprocessor is further programmed to calculate the nozzle error correction coefficient K_Glqfh based on said nozzle lift amount when said engine is in said idle running state.

10. A fuel injection device as defined in claim 8, wherein said microprocessor is further programmed to set a gain B_Glqfh expressing an error magnification between said idle running state and a present state based on said engine running state, said gain B_Glqfh being smaller the nearer said present state is to said idle running state, calculate said injection amount error Dqsol1 by the following equation [1], and calculate said estimated real injection amount Qsol_real by the following equation [2]:

$$Dqsol1 = Dqsol^{*} \cdot B\_Glqfh \cdot K\_Glqfh \quad [1]$$

$$Qsol\_real = Qsol2 - Dqsol1. \quad [2]$$

11. A fuel injection device as defined in claim 8, wherein said nozzle operating state detecting sensor comprises a sensor for detecting a lift start timing of said fuel injection nozzle, and said microprocessor is further programmed to calculate a nozzle error correction coefficient K_Glqfh based on said nozzle lift start timing when said engine is in said idle running state.

12. A fuel injection device as defined in claim 11, wherein said engine comprises a fuel injection pump for supplying pressurized fuel to said fuel injection nozzle, and said microprocessor is further programmed to fix a fuel supply timing of said fuel injection pump and calculate the nozzle error correction coefficient K_Glqfh based on a difference between said nozzle lift start timing when said fuel supply timing is fixed and a predetermined timing.

* * * * *